United States Patent [19]

Nio et al.

[11] Patent Number: 5,341,172
[45] Date of Patent: Aug. 23, 1994

[54] IMAGE DISPLAY APPARATUS FOR DISPLAYING IMAGES OF PLURALITY OF KINDS OF VIDEO SIGNALS

[75] Inventors: Yutaka Nio, Hirakata; Ryuji Matsuura, Takatsuki, both of Japan

[73] Assignee: Matsushita Electric Industrial Co., Ltd., Kadoma, Japan

[21] Appl. No.: 855,797

[22] Filed: Mar. 23, 1992

[30] Foreign Application Priority Data

Mar. 22, 1991 [JP] Japan ................... 3-058661

[51] Int. Cl.$^5$ ............ H04N 7/01; H04N 11/20; H04N 5/46
[52] U.S. Cl. .................. 348/441; 348/443
[58] Field of Search ........... 358/140, 11, 21 R, 181, 358/141; H04N 5/46, 11/20, 7/01

[56] References Cited

U.S. PATENT DOCUMENTS

| | | | |
|---|---|---|---|
| 4,283,736 | 8/1981 | Morio | 358/11 |
| 4,668,974 | 5/1987 | Kita | 358/11 |
| 4,672,446 | 6/1987 | Ikeda | 358/11 |
| 4,872,054 | 10/1989 | Gray | 358/140 |
| 5,043,811 | 8/1991 | Yasuhiro | 358/11 |
| 5,218,436 | 6/1993 | Sugiyama et al. | 358/140 |

FOREIGN PATENT DOCUMENTS

| | | | |
|---|---|---|---|
| 0023689 | 2/1980 | Japan | 358/11 |
| 0052684 | 4/1980 | Japan | 358/11 |
| 0104866 | 6/1984 | Japan | 358/11 |
| 63-24595 | 5/1988 | Japan | H04N 9/00 |
| 0194781 | 8/1989 | Japan | H04N 7/01 |
| 4015020 | 11/1991 | United Kingdom | H04N 7/01 |

*Primary Examiner*—James J. Groody
*Assistant Examiner*—Chris Grant
*Attorney, Agent, or Firm*—Wenderoth, Lind & Ponack

[57] ABSTRACT

In an image display apparatus including a display unit for displaying an image of an inputted video signal thereon with a predetermined field frequency and a predetermined number of scanning lines using vertical and horizontal synchronizing signals for deflection of display in response to the inputted video signal, a first converter converts an inputted first video signal, having a first field frequency which is lower than the predetermined field frequency and having the predetermined number of scanning lines, into an output second video signal having the predetermined field frequency which is and the predetermined number of scanning lines, and having outputs the output second video signal to the display unit. Further, a second convertor converts an inputted third video signal, having a first number of scanning lines which is smaller than the predetermined number of scanning lines and having the predetermined field frequency into an output fourth video signal having the predetermined field frequency and the predetermined number of scanning lines, and outputs the output fourth video signal to the display unit.

7 Claims, 17 Drawing Sheets

Fig. 5  Odd/Even Judgment signal generator 32 (35)

Fig. 7 Read controller 34

Fig. 8 Read controller 41

Fig. 9 Output synchronizing signal generator 114a

IMAGE DISPLAY APPARATUS FOR DISPLAYING IMAGES OF PLURALITY OF KINDS OF VIDEO SIGNALS

BACKGROUND OF THE INVENTION

1. Field of the Invention

The present invention relates to an image display apparatus, and more particularly, to an image display apparatus for displaying images of a plurality of kinds of video signals such as an NTSC (National Television System Committee) video signal, a PAL (Phase Alternating by Line) video signal, a SECAM (Sequential Memoire Color television System) video signal, or the like.

2. Description of the Prior Art

Currently, there are used various kinds of video signals such as the NTSC video signal, the PAL video signal, the SECAM video signal or the like, wherein the number of scanning lines of one kind of video signal may be different from that of another kind of video signal and the field frequency of one kind of video signal may be different from that of another kind of video signal. For example, the NTSC video signal has 525 horizontal scanning lines and a field frequency of 60 Hz, and each of the PAL video signal and the SECAM video signal has 625 horizontal scanning lines and a field frequency of 50 Hz. In this specification, a horizontal scanning line is referred to as a scanning line hereinafter.

Generally speaking, a display apparatus for displaying a first kind of video signal thereon can not display a second kind of video signal which is different from the first kind of video signal. For example, a display apparatus for displaying the NTSC video signal can not display the PAL video signal. However, there has been developed and sold a conventional multi-system type television set capable of receiving and demodulating broadcast waves which are respectively modulated according to a plurality of kinds of video signals, and displaying one kind of video signal selected from among the demodulated video signals.

FIG. 1 shows a conventional multi-system type television set of this type. In FIGS. 1 and 2, only circuits for processing a video signal are shown. Since circuits for processing an audio signal are constituted in a manner similar to that known to those skilled in the art, these circuits have been omitted in the drawing Figures and the specification of the present application.

Referring to FIG. 1, broadcast waves which are modulated according to an NTSC video signal, a PAL video signal and a SECAM signal are received by an antenna 100, and then, are inputted to a television tuner 101. The television tuner 101 comprises a high frequency amplifier and a frequency converter, and amplifies and converts the received broadcast waves into video intermediate frequency signals (referred to as VIF signals hereinafter) of the NTSC, PAL and SECAM video signals, respectively, to output the VIF signals through contacts (a), (b) and (c) of a switch SW1 to VIF amplifiers and demodulator 102a, 102b and 102c for the NTSC, PAL and SECAM video signals.

Switches SW1 to SW7 are provided for selecting the broadcast waves of the respective signals, and are manually switched over by the operator interlocking with each other. In case of receiving the broadcast wave of the NTSC video signal, the switches SW1 to SW5 are switched over to respective contacts (a) thereof and the switches SW6 and SW7 are switched over to respective contacts (b) thereof. In case of receiving the broadcast wave of the PAL video signal, the switches SW1 to SW5 are switched over to respective contacts (b) thereof and the switches SW6 and SW7 are switched over to respective contacts (a) thereof. In case of receiving the broadcast wave of the SECAM signal, the switches SW1 to SW5 are switched over to respective contacts (c) thereof and the switches SW6 and SW7 are switched over to respective contacts (a) thereof.

Each of the VIF amplifiers and demodulator 102a, 102b and 102c has a VIF amplifier and a demodulator for each corresponding video signal, and outputs a video signal including a luminance signal, a color signal and synchronizing signals through the either one of contacts (a), (b) and (c) of the switch SW2 and a common terminal thereof to the contact (a) of the switch SW10 provided for manually selecting either one of a video signal outputted from either one of the outputs from the VIF amplifiers and demodulator 102a, 102b and 102c, and video signals inputted through external input terminals 103a and 103b from external units such as video tape recorders, video disc players, video cameras or the like. The external input terminal 103a is connected to the contact (b) of the switch SW10, and the external input terminal 103b is connected to the contact (c) of the switch SW10. A common terminal of the switch SW10 is connected through either one of the contacts (a), (b) and (c) of the switch SW3 to either one of respective input terminals of Y/C separation circuits 104a, 104b and 104c for the NTSC, PAL and SECAM video signals, respectively.

Each of the Y/C separation circuits 104a, 104b and 104c separates an analog luminance signal Y including the synchronizing signals and an analog color signal C from the inputted video signal, outputs the separated luminance signal Y including the synchronizing signal through either one of the contacts (a), (b) and (c) of the switch SW4 to a RGB matrix circuit 105 and a synchronizing separation circuit 108, and also outputs the separated color signal C through either one of the contacts (a), (b) and (c) of the switch SW5 to the RGB matrix circuit 105. The RGB matrix circuit 105 generates R (red), G (green) and B (blue) image signals (referred to as RGB image signals hereinafter) in response to the analog luminance signal Y and the analog color signal C, and outputs the RGB image signals to a CRT display unit 106 having a deflection yoke 107.

On the other hand, the synchronizing separation circuit 108 separates and reproduces horizontal and vertical synchronizing pulses HSP and VSP from the inputted analog luminance signal Y, and outputs them through either one of the contacts (a) and (b) of the switch SW6 to either one of deflection signal generators 109a and 109b, respectively. In response to the synchronizing pulses HSP and VSP, the deflection signal generator 109a generates deflection signals having a field frequency of 50 Hz and 625 scanning lines, i.e., horizontal and vertical pluses for deflection of display in the CRT display unit 106, and outputs them through the contact (a) of the switch SW7 to the deflection yoke 107 of the CRT display unit 106. On the other hand, in response to the synchronizing pulses HSP and VSP, the deflection signal generator 109b generates deflection signals having a field frequency of 60 Hz and 525 scanning lines, i.e., horizontal and vertical pluses for deflection of display in the CRT display unit 106, and outputs them through the contact (b) of the switch SW7 to the deflection yoke 107 of the CRT display unit 106. Then, the CRT display unit 106 displays an image of the selected video signal thereon with a deflection frequency corresponding to the field frequency and the number of the scanning lines of the kind of the video signal to be displayed.

However, in the above-mentioned conventional multi-system type television set, there are provided the deflection signal generators 109a and 109b for generating the horizontal and vertical pulses (H and V Pulses) for deflection of display using an analog process. Therefore, the deflection signal generators 109a and 109b have complicated structures, respectively, resulting in an expensive cost thereof.

Further, since the CRT display unit 106 having a predetermined specification displays images of a plurality of kinds of video signals having field frequencies different from each other and having numbers of scanning lines different from each other, it is extremely difficult to correct for a convergence and geometric distortions such as the so-called bobbin winder distortion or the like which may be caused therein, resulting in deteriorating a quality of displayed image on the CRT display unit 106.

SUMMARY OF THE INVENTION

An object of the present invention is therefore to provide an image display apparatus having a simple structure, capable of displaying images of a plurality of kinds of video signals with a quality of image better than that of the conventional apparatus.

Another object of the present invention is to provide a multi-system type television set having a simple structure, capable of displaying images of a plurality of kinds of video signals with a quality of image better than that of the conventional apparatus.

A further object of the present invention is to provide a video signal converter apparatus capable of more correctly converting a video signal having a first field frequency into another video signal having a second field frequency higher than the first field frequency, said converter circuit having a structure simpler than that of the conventional apparatus.

A still further object of the present invention is to provide a video signal converter apparatus capable of more correctly converting a video signal having a first number of scanning lines thereof into another video signal having a second number of scanning lines thereof larger than the first number thereof, said converter circuit having a structure simpler than that of the conventional apparatus.

In order to achieve the aforementioned objective, according to one aspect of the present invention, there is provided an image display apparatus comprising:

a first synchronizing signal generating means for reproducing and generating first vertical and horizontal synchronizing signals in response to an inputted video signal, said inputted video signal of one frame being composed of an odd field and an even field each field including a plurality of scanning lines;

a second synchronizing signal generating means for generating second vertical and horizontal synchronizing signals for deflection of display in response to said vertical and horizontal synchronizing signals generated by said first synchronizing signal generating means;

display means for displaying an image of an inputted video signal thereon with a predetermined field frequency and a predetermined number of scanning lines, said display means being controlled by a deflection which is responsive to said second vertical and horizontal synchronizing signals outputted from said second synchronizing signal generating means;

a first converting means for converting an inputted first video signal, having a first field frequency which is lower than said predetermined field frequency and having said predetermined number of scanning lines into an output second video signal having said predetermined field frequency and said predetermined number of scanning lines, using said first and second vertical and horizontal synchronizing signals generated by said first and second synchronizing signal generating means, and for outputting said output second video signal to said display means; and a second converting means for converting an inputted third video signal, having a first number of scanning lines which is smaller than said predetermined number of scanning lines and having said predetermined field frequency into an output fourth video signal having said predetermined field frequency and said predetermined number of scanning lines, using said first and second vertical and horizontal synchronizing signals generated by said first and second synchronizing signal generating means, and for outputting said output fourth video signal to said display means.

According to another aspect of the present invention, there is provided an image display apparatus comprising:

first synchronizing signal generating means for reproducing and generating first vertical and horizontal synchronizing signals in response to an inputted video signal, said inputted video signal of one frame being composed of an odd field and an even field each field including a plurality of scanning lines;

second synchronizing signal generating means for generating second vertical and horizontal synchronizing signals for deflection of display in asynchronous with said vertical and horizontal synchronizing signals generated by said first synchronizing signal generating means;

display means for displaying an image of an inputted video signal thereon with a predetermined field frequency and a predetermined number of scanning lines using said second vertical and horizontal synchronizing signals outputted from said second synchronizing signal generating means in response to said inputted video signal;

first converting means for converting an inputted first video signal having a first field frequency lower than said predetermined field frequency and said predetermined number of scanning lines into an output second video signal having said predetermined field frequency and said predetermined number of scanning lines, using said first and second vertical and horizontal synchronizing signals generated by said first and second synchronizing signal generating means, and outputting said output second video signal to said display means; and second converting means for converting an inputted third video signal having a first number of scanning lines smaller than said predetermined number of scanning lines and said predetermined field frequency into an output fourth video signal having said predetermined field frequency and said predetermined number of scanning lines, using said first and second vertical and horizontal synchronizing signals generated by said first and second synchronizing signal generating means, and outputting said output fourth video signal to said display means.

According to a further aspect of the present invention, there is provided a television set comprising:

a tuner means for respectively converting broadcast waves modulated according to a plurality of kinds of video signals into said plurality of kinds of video signals;

a switch means for selecting either one of said plurality of kinds of video signals and outputting a selected video signal;

a first synchronizing signal generating means for reproducing and generating first vertical and horizontal synchronizing signals in response to said selected video signal outputted from said switch means, said selected video signal of one frame being composed of an odd field and an even field each field including a plurality of scanning lines;

a second synchronizing signal generating means for generating second vertical and horizontal synchronizing signals for deflection of display in response to said vertical and horizontal synchronizing signals generated by said first synchronizing signal generating means;

a display means for displaying said selected image of an video signal thereon with a predetermined field frequency and a predetermined number of scanning lines, said display means being controlled by a deflection which is responsive to said second vertical and horizontal synchronizing signals outputted from said second synchronizing signal generating means;

a first converting means for converting said selected video signal, having a first field frequency which is lower than said predetermined field frequency and having said predetermined number of scanning lines into an output second video signal having said predetermined field frequency and said predetermined number of scanning lines, using said first and second vertical and horizontal synchronizing signals generated by said first and second synchronizing signal generating means, and for outputting said output second video signal to said display means; and a second converting means for converting another selected video signal, having a first number of scanning lines which is smaller than said predetermined number of scanning lines and having said predetermined field frequency, into an output fourth video signal having said predetermined field frequency and said predetermined number of scanning lines, using said first and second vertical and horizontal synchronizing signals generated by said first and second synchronizing signal generating means, and for outputting said output fourth video signal to said display means;

wherein said switch means enables either one of said first and second converting means to operate depending on said selected video signal.

According to a still further aspect of the present invention, there is provided a television set comprising:

tuner means for respectively converting broadcast waves modulated according to a plurality of kinds of video signals into said plurality of kinds of video signals;

switch means for selecting either one of said plurality of kinds of video signals and outputting the selected video signal;

first synchronizing signal generating means for reproducing and generating first vertical and horizontal synchronizing signals in response to the selected video signal outputted from said switch means, said inputted video signal of one frame being composed of an odd field and an even field each field including a plurality of scanning lines;

second synchronizing signal generating means for generating second vertical and horizontal synchronizing signals for deflection of display in asynchronous with said vertical and horizontal synchronizing signals generated by said first synchronizing signal generating means;

display means for displaying an image of an inputted video signal thereon with a predetermined field frequency and a predetermined number of scanning lines using said second vertical and horizontal synchronizing signals outputted from said second synchronizing signal generating means in response to said inputted video signal;

first converting means for converting said selected video signal having a first field frequency lower than said predetermined field frequency and said predetermined number of scanning lines into an output second video signal having said predetermined field frequency and said predetermined number of scanning lines, using said first and second vertical and horizontal synchronizing signals generated by said first and second synchronizing signal generating means, and outputting said output second video signal to said display means; and second converting means for converting said selected inputted video signal having a first number of scanning lines smaller than said predetermined number of scanning lines and said predetermined field frequency into an output fourth video signal having said predetermined field frequency and said predetermined number of scanning lines, using said first and second vertical and horizontal synchronizing signals generated by said first and second synchronizing signal generating means, and outputting said output fourth video signal to said display means, wherein said switch means enables either one of said first and second converting means to operate depending on said selected video signal.

According to a still another further aspect of the present invention, there is provided a video signal converter apparatus comprising:

a first converting means for converting an inputted first video signal, having a first field frequency which is lower than a predetermined field frequency and having a predetermined number of scanning lines, into an output second video signal having said predetermined field frequency and said predetermined number of scanning lines, using external first and second vertical and horizontal synchronizing signals, and for outputting said output second video signal, said first input video signal of one frame being composed of an odd field and an even field each field including a plurality of scanning lines;

said first converting means comprising:

a field memory for storing a video signal of one field;

a first judgment signal generating means for judging whether or not the scanning lines of the odd field have been replaced by the scanning lines of the even field when displaying the image of said inputted video signal on display means, and for generating a first judgment signal for representing the judgment result; and a first control signal generating means for generating a first write control signal for controlling said field memory to write said inputted first video signal therein and a first read control signal for controlling said field memory to read out said video signal therefrom in response to said external first and second vertical and horizontal synchronizing signals, and for outputting the first write and read control signals to said field memory, said first control signal generating means delaying said first read control signal by one scanning line when said first judgment signal represents that the scanning lines of the odd field have been replaced by the scanning lines of the even field.

According to a furthermore aspect of the present invention, there is provided a video signal converter apparatus comprising:

a second converting means for converting an inputted third video signal, having a first number of scanning lines which is smaller than a predetermined number of scanning lines and having a predetermined field frequency into an output fourth video signal having said predetermined field frequency and said predetermined number of scanning lines, using external first and second vertical and horizontal synchronizing signals, and for outputting said output fourth video signal, said inputted third video signal of one frame being composed of an odd field and an even field each field including a plurality of scanning lines;

said second converting means comprising:

a field memory for storing a video signal of one field;

a delay means for delaying said video signal outputted from said field memory by one scanning line;

a second control signal generating means for generating a second write control signal for controlling said field memory to write said inputted video signal therein and a second read control signal for controlling said field memory to read out said video signal therefrom so as to insert a video signal of one field having no data to said read video signal for a predetermined time interval in response to said external first and second vertical and horizontal synchronizing signals, and for outputting the second write and read control signals to said field memory, the frequency of the second read control signal being set to be higher than that of the second write control signal depending on a ratio of the frequency of the read control signal to the frequency of the write control signal;

a first amplifying means for amplifying said video signal outputted from said field memory with a predetermined first amplification factor;

a second amplifying means for amplifying said video signal outputted from said delay means; and an adding means for adding a video signal amplified by said first amplifying means and a video signal amplified by said second amplifying means so as to interpolating said video signal of one field having no data in the added video signal, and for outputting the added video signal having the addition result.

According to still a further aspect of the present invention, there is provided a video signal converter apparatus comprising:

first converting means for converting an inputted first video signal having a first field frequency lower than a predetermined field frequency and a predetermined number of scanning lines into an output second video signal having said predetermined field frequency and said predetermined number of scanning lines, using external first and second vertical and horizontal synchronizing signals, said first vertical and horizontal synchronizing signal being asynchronous with said second vertical and horizontal synchronizing signals, and outputting said output second video signal, said inputted first video signal of one frame being composed of an odd field and an even field each field including a plurality of scanning lines, said first converting means comprising:

first and second field memories each memory storing a video signal of one field;

first judgment signal generating means for judging whether or not the scanning lines of the odd field are replaced with the scanning lines of the even field when displaying the image of said inputted video signal on display means, and generating a first judgment signal for representing the judgment result;

first control signal generating means for generating a first write control signal for controlling said first and second field memories alternately by one field of said inputted video signal to write said inputted video signal therein and a first read control signal for controlling said first and field memories to read out said video signal therefrom in response to said external first and second vertical and horizontal synchronizing signals, and outputting the first write and read control signals to said first and second field memories, said first control signal generating means delaying said first read control signal by one scanning line when said first judgment signal represents that the scanning lines of the odd field are replaced with the scanning lines of the even field; and timing correction means for delaying said first read control signal by one scanning line when said first judgment signal represents that the scanning lines of the odd field are replaced with the scanning lines of the even field, thereby preventing said first read control signal from being generated prior to said first write control signal, and preventing said first write control signal from being generated prior to said first read control signal.

According to another aspect of the present invention, there is provided a video signal converter apparatus comprising:

second converting means for converting an inputted third video signal having a first number of scanning lines smaller than a predetermined number of scanning lines and a predetermined field frequency into an output fourth video signal having said predetermined field frequency and said predetermined number of scanning lines, using external first and second vertical and horizontal synchronizing signals, said first vertical and horizontal synchronizing signal being asynchronous with said second vertical and horizontal synchronizing signals, and outputting said output fourth video signal, an inputted third video signal of one frame being composed of an odd field and an even field each field including a plurality of scanning lines, said second converting means comprising:

first and second field memories each memory storing a video signal of one field;

delay means for delaying said video signal outputted from said first and second field memories by one scanning line;

second control signal generating means for generating a second write control signal for controlling said first and second field memories to write said inputted video signal therein and a second read control signal for controlling said first and second field memories to read out said video signal therefrom so as to insert a video signal of one field having no data to said read video signal for a predetermined time interval in response to said external first and second vertical and horizontal synchronizing signals, and outputting the second write and read control signals to said first and field memories, the frequency of the second read control signal being set to be higher than that of the second write control signal depending on a ratio of the frequency of the read control signal to the frequency of the write control signal;

first amplifying means for amplifying said video signal outputted from said first and second field memory with a predetermined first amplification factor;

second amplifying means for amplifying said video signal outputted from said delay means;

adding means for adding a video signal amplified by said first amplifying means and a video signal amplified by said second amplifying means so as to interpolating said video signal of one field having no data in the added video signal, and outputting the added video signal having the addition result;

further judgment signal generating means for judging whether or not the scanning lines of the odd field are replaced with the scanning lines of the even field when displaying the image of said inputted video signal on display means, and generating a further judgment signal for representing the judgment result; and timing correction means for delaying said second read control signal by one scanning line when said further judgment signal represents that the scanning lines of the odd field are replaced with the scanning lines of the even field, thereby preventing said second read control signal from being generated prior to said second write control signal, and preventing said second write control signal from being generated prior to said second read control signal.

As described above, according to the present invention, for example, in case of the NTSC signal, the NTSC signal is converted into the video signal having 625 scanning lines and a field frequency of 60 Hz, and then, an image of the NTSC signal can be displayed on said display means with 625 scanning lines and a field frequency of 60 Hz. Further, in case of the PAL or SECAM signal, the PAL or SECAM signal is converted into the video signal having a field frequency of 60 Hz and 625 scanning lines, and then, an image of the PAL or SECAM signal can be displayed on said display means with 625 scanning lines and a field frequency of 60 Hz. As a result, deterioration of the quality of image to be displayed can be lowered, resulting in a high quality image display on said display means.

Further, according to the present invention, each of the video signal converter apparatus for converting a first field frequency of a video signal into a predetermined second field frequency higher than the first field frequency and another video signal converter apparatus for converting a first number of scanning lines of a video signal into a predetermined second number of scanning lines larger than the first number thereof can be constituted using only one field memory, and these converter apparatuses can be simplified as compared with the prior art circuits 109a and 109b. As a result, there can be provided a multi-system type television set more inexpensive than the conventional multi-system type television set, shown in FIG. 1.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

FIRST PREFERRED EMBODIMENT

Figure 1:
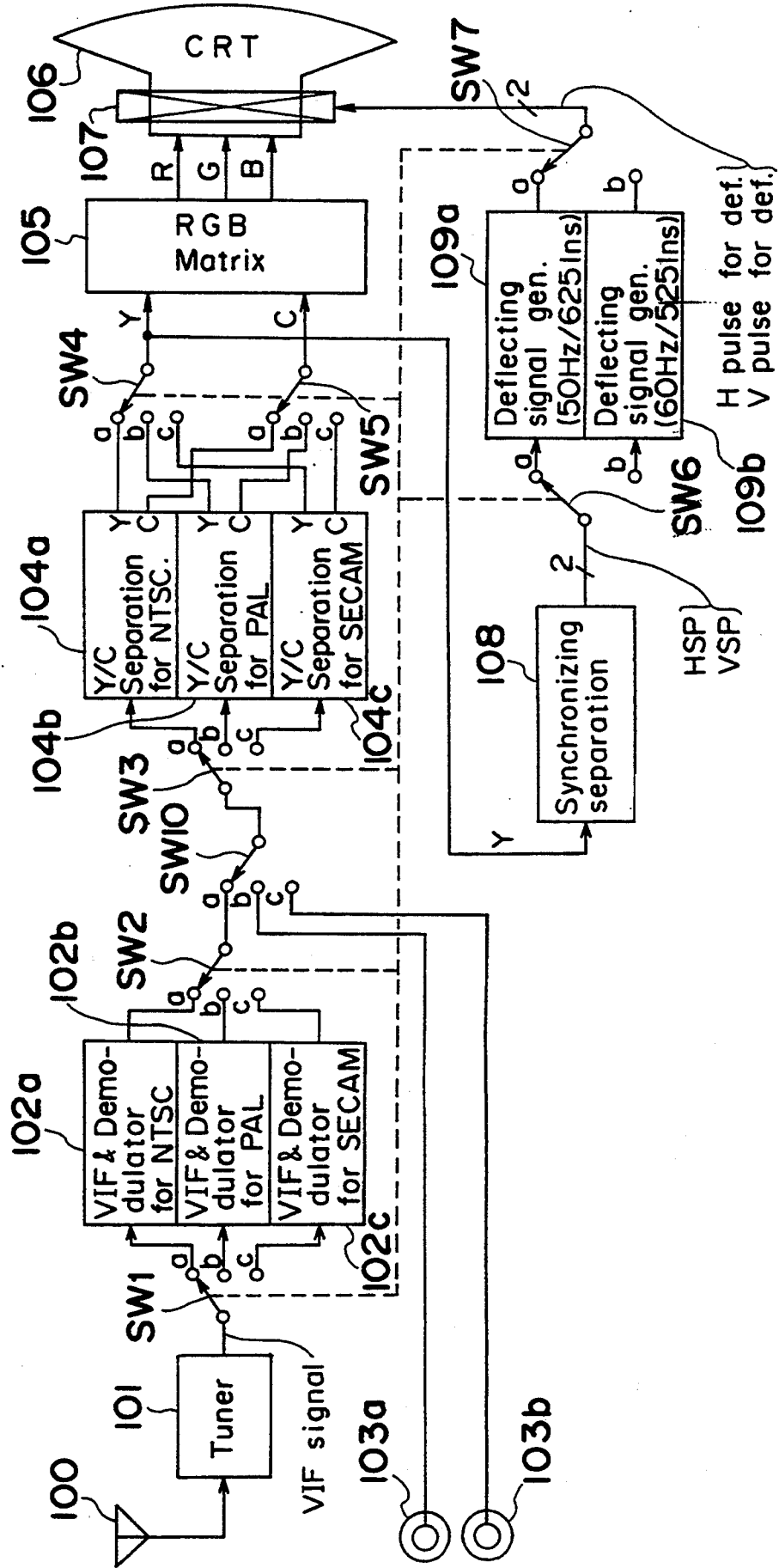
FIG. 1 is a schematic block diagram of a conventional multi-system type television set.
Figure 2:
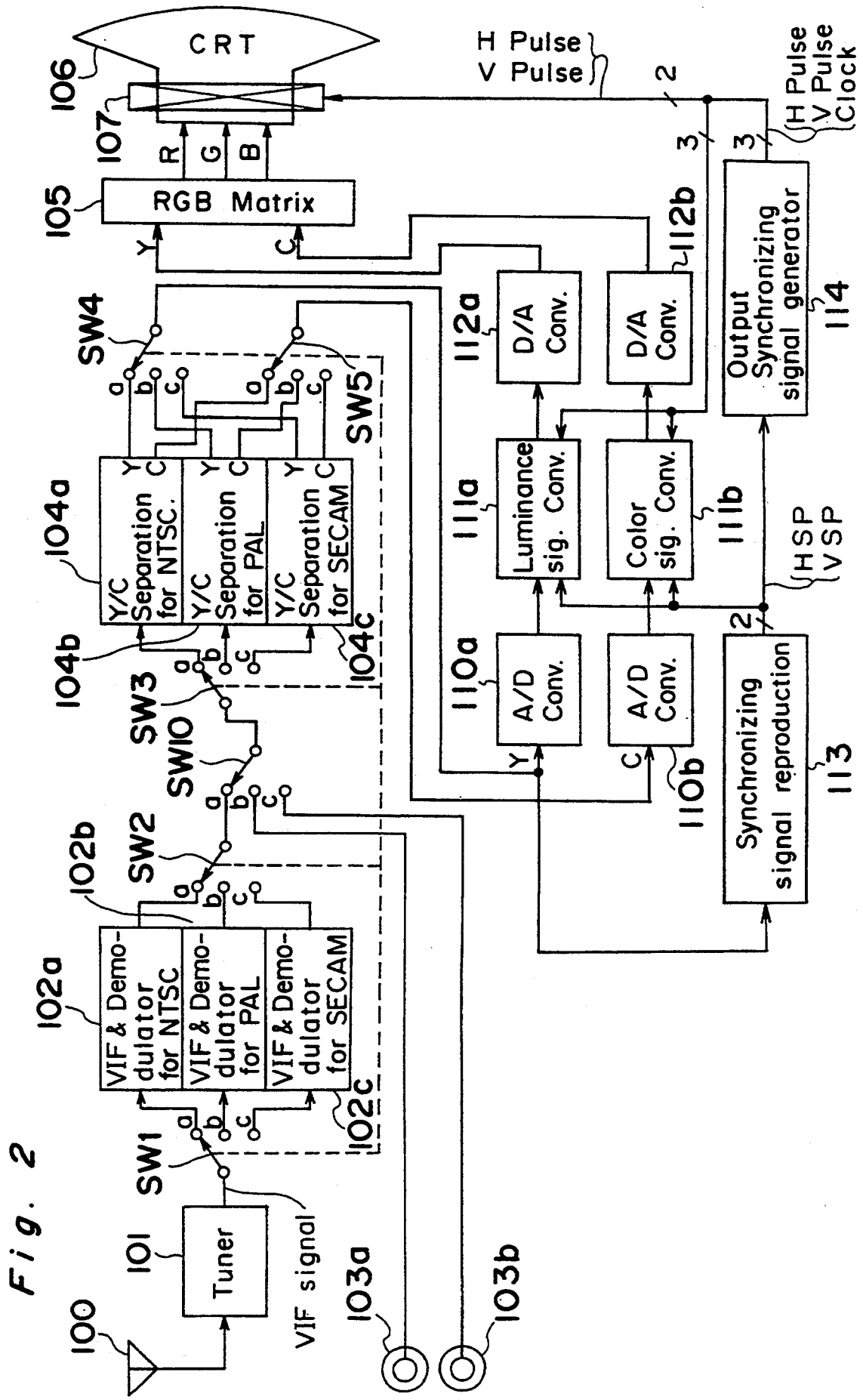
FIG. 2 is a schematic block diagram of a multi-system type television set of a first preferred embodiment according to the present invention.

FIG. 2 shows a multi-system type television set of a first preferred embodiment according to the present invention. In FIG. 2, the same circuits as those shown in FIG. 1 are denoted by the same reference numerals as those shown in FIG. 1.

As is clear from comparison between FIGS. 1 and 2, the multi-system type television set of the first preferred embodiment is characterized in comprising:

(a) analog to digital converters (referred to as A/D converters hereinafter) 110a and 110b;
(b) a luminance signal converter 111a;
(c) a color signal converter 111b;
(d) digital to analog converters (referred to as D/A converters hereinafter) 112a and 112b;
(e) a synchronizing signal reproduction circuit 113; and
(f) an output synchronizing signal generator 114;

instead of the synchronizing separation circuit 108 and the deflection signal generators 109a and 109b which are shown in FIG. 1.

In particular, the luminance signal converter 111a is characterized in converting either one of NTSC, PAL and SECAM digital luminance signals into a digital luminance signal having a field frequency of 60 Hz and 625 scanning lines using a digital process as described in detail later. Also, the color signal converter 111b is characterized in converting either one of NTSC, PAL and SECAM digital color signals into a digital color signal having a field frequency of 60 Hz and 625 scanning lines using a digital process as described in detail later. Further, the CRT display unit 106 displays an image of a video signal including a luminance signal and a color signal thereon, which has a field frequency of 60 Hz and 625 scanning lines. In the present preferred embodiment, the CRT display unit 106 is made and adjusted in a manner similar to that known to those skilled in the art so as to display an image of a video signal having a field frequency of 60 Hz and 625 scanning lines with the highest quality thereof.

Differences between the multi-system type television set of the first preferred embodiment shown in FIG. 2 and the conventional multi-system type television set shown in FIG. 1 will be described below.

When the switches SW1 to SW4 are manually switched over by the operator, a switch control signal (not shown) for indicating the contact thereof to be selected is generated and inputted to the luminance signal converter 111a, the color signal converter 111b and the output synchronizing signal generator 114.

The synchronizing signal reproduction circuit 113 reproduces and generates the horizontal and vertical synchronizing pulses HSP and VSP in response to the luminance signal from either one of the Y/C separation circuits 104a, 104b and 104c through the common terminal of the switch SW4 in a manner similar to that known to those skilled in the art, and outputs them to the luminance signal converter 111a, the color signal converter 111b and the output synchronizing signal generator 114. The horizontal and vertical synchronizing pulses HSP and VSP generated by the synchronizing signal reproduction circuit 113 are used for write operations of a field memory 8 shown in FIG. 4. Further, the output synchronizing signal generator 114 generates horizontal and vertical synchronizing pulses (H and V Pulses) and a clock in response to the horizontal and vertical synchronizing pulses HSP and VSP from the synchronizing signal reproduction circuit 113 as described in detail later with reference to FIG. 3, outputs them to the luminance signal converter 111a and the color signal converter 111b, and also outputs the horizontal and vertical synchronizing pulses (H and V Pulses) for deflection of display to the deflection yoke 107 of the CRT display unit 106. The horizontal and vertical synchronizing pulses (H and V Pulses) generated by the output synchronizing signal generator 114 are used for read operations of the field memory 8 shown in FIG. 4 and for read and write operations of the line memory 9 shown in FIG. 4.

In the first preferred embodiment, since the output synchronizing signal generator 114 generates the horizontal and vertical synchronizing pulses (H and V Pulses) and the clock in response to the horizontal and vertical synchronizing pulses HSP and VSP from the synchronizing signal reproduction circuit 113, they are synchronous with the horizontal and vertical synchronizing pulses HSP and VSP inputted from the synchronizing signal reproduction circuit 113 to the luminance signal converter 111a and the color signal converter 111b. This is one of the features of the first preferred embodiment.

Further, the A/D converter 110a converts the inputted analog luminance signal Y from the common terminal of the switch SW4 into a digital luminance signal, and outputs them to the luminance signal converter 111a. The A/D converter 110b converts the inputted analog color signal C from the common terminal of the switch SW5 into a digital color signal, and outputs them to the color signal converter 111b.

Thereafter, the luminance signal converter 111a converts the inputted digital luminance signals into a digital luminance signal having a field frequency of 60 Hz and 625 scanning lines using a digital process based on the horizontal and vertical synchronizing pulses (H and V Pulses), as described in detail later with reference to FIG. 4. On the other hand, the color signal converter 111b converts the inputted digital color signals into a digital color signal having a field frequency of 60 Hz and 625 scanning lines using a digital process based on the horizontal and vertical synchronizing pulses (H and V Pulses), in a manner similar to that of the luminance signal converter 111a. Therefore, the description and the Figure of the color signal converter 111b are omitted therein.

Further, the D/A converter 112a converts the inputted digital luminance signal having a field frequency of 60 Hz and 625 scanning lines into an analog luminance signal, and outputs it to the RGB matrix circuit 105. On the other hand, the D/A converter 112b converts the inputted digital color signal having a field frequency of 60 Hz and 625 scanning lines into an analog color signal, and outputs it to the RGB matrix circuit 105.

It is to be noted that the compositions of the television tuner 101, the VIF amplifiers and demodulator 102a, 102b and 102c, the Y/C separation circuits 104a, 104b and 104c, and the RGB matrix circuit 105 are the same as those shown in FIG. 1.

The RGB matrix circuit 105 generates RGB image signals in response to the analog luminance signal Y and the analog color signal C, and outputs the RGB signals to the CRT display unit 106 having the deflection yoke 107. Then, the CRT display unit 106 displays thereon an image of the video signal manually selected by the switches SW1 to SW5 and SW10 with a deflection frequency corresponding to the field frequency of 60 Hz and 625 scanning lines.

Figure 3:
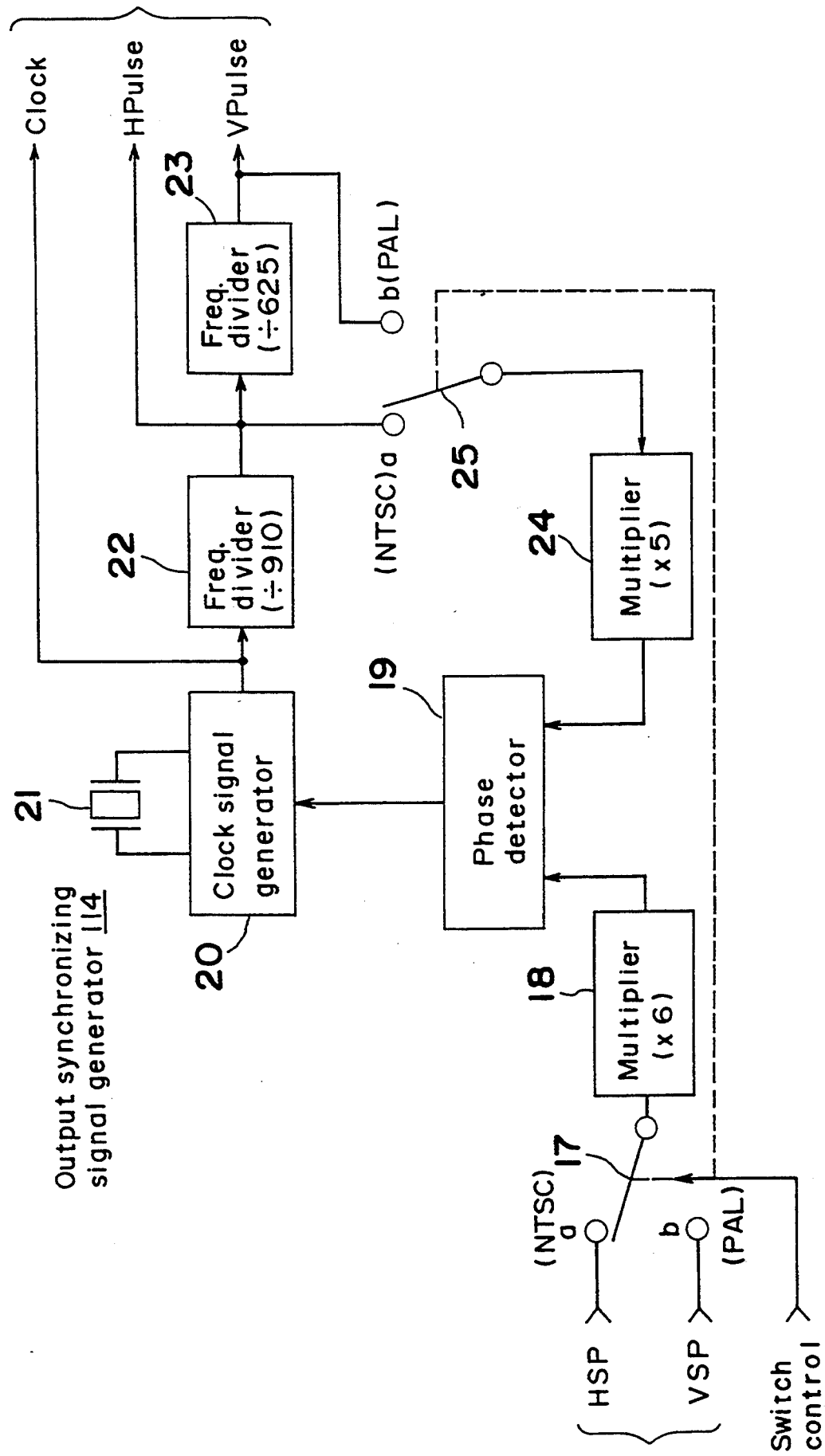
FIG. 3 is a schematic diagram of an output synchronizing signal generator 114 shown in FIG. 2.

FIG. 3 shows the output synchronizing signal generator 114 shown in FIG. 2.

Referring to FIG. 3, the output synchronizing signal generator 114 comprises switches 17 and 25, multipliers 18 and 24, a phase detector 19, a clock signal generator 20 having a crystal resonator 21, and frequency dividers 22 and 23. The above-mentioned switch control signal is inputted to respective control terminals of the switches 17 and 25. In case of selecting the NTSC video signal, each of the switches 17 and 25 is switched over to the contact (a) thereof. Further, in case of selecting either the PAL or SECAM video signal, each of the switches 17 and 25 is switched over to the contact (b) thereof.

The horizontal synchronizing pulse HSP from the synchronizing signal reproduction circuit 113 is inputted through the contact (a) of the switch SW17 to the multiplier 18, and the vertical synchronizing pulse VSP from the synchronizing signal reproduction circuit 113 is inputted through the contact (b) of the switch SW17 to the multiplier 18. The multiplier 18 multiplies the frequency of the inputted synchronizing pulse by a multiplication factor of six, and outputs a synchronizing pulse having six times the frequency of the inputted synchronizing pulse to the phase detector 19.

The clock signal generator 20 having the crystal resonator 21 generates a clock in synchronous with the inputted signal from the phase detector 19 so as to generate the clock having the same frequency as that of the signal outputted from the multiplier 18, and outputs the clock to the frequency divider 22, the luminance signal converter 111a and the color signal converter 111b shown in FIG. 2.

Also, the frequency divider 22 divides the frequency of the inputted clock from the clock signal generator 20 by a division factor of 910, outputs a frequency-divided signal having a divided frequency to the frequency divider 23 and also through the contact (a) of the switch 25 to the multiplier 24, and outputs the frequency-divided signal as the horizontal synchronizing pulse (H Pulse) to the luminance signal converter 111a, the color signal converter 111b and the deflection yoke 107. Further, the frequency divider 23 divides the frequency of the inputted signal from the frequency divider 22 by a division factor of 625, outputs a frequency-divided signal having a divided frequency through the contact (b) of the switch 25 to the multiplier 24, and also outputs the frequency-divided signal as the vertical synchronizing pulse (V Pulse) to the luminance signal converter 111a, the color signal converter 111b and the deflection yoke 107.

The multiplier 24 multiplies the frequency of the inputted signal by a multiplication factor of five, and outputs a synchronizing pulse having five times the frequency of the inputted signal to the phase detector 19. The phase detector 19 compares the inputted signal from the multiplier 18 with another inputted signal from the multiplier 24, and outputs a signal for indicating a comparison result therebetween or a phase detection result therebetween through a low pass filter (not shown) to the clock signal generator 20.

In the output synchronizing signal generator 114 constituted as described above, in case of selecting the NTSC video signal, a first phase locked loop circuit (a phase locked loop circuit is referred to as a PLL circuit hereinafter) is constituted by the clock signal generator 20, the frequency divider 22, the multiplier 24 and the phase detector 19. In this case, the clock signal generator 20 generates a clock having the same frequency as six times the frequency of the horizontal synchronizing pulse HSP six times the horizontal scanning frequency of about 15.75 Khz of the NTSC video signal. Further, the output synchronizing signal generator 114 generates and outputs the horizontal and vertical synchronizing signals (H and V Pulses) synchronous with the clock generated by the first PLL circuit.

On the other hand, in case of selecting either the PAL or SECAM video signal, another second PLL circuit is constituted by the clock signal generator 20, the frequency dividers 22 and 23, the multiplier 24 and the phase detector 19. In this case, the clock signal generator 20 generates a clock having the same frequency as six times the frequency of the vertical synchronizing pulse VSP or six times the vertical scanning frequency of about 50 Hz of either the PAL or SECAM video signal. Further, the output synchronizing signal generator 114 generates and outputs the horizontal and vertical synchronizing signals (H and V Pulses) synchronous with the clock generated by the second PLL circuit.

Figure 4:
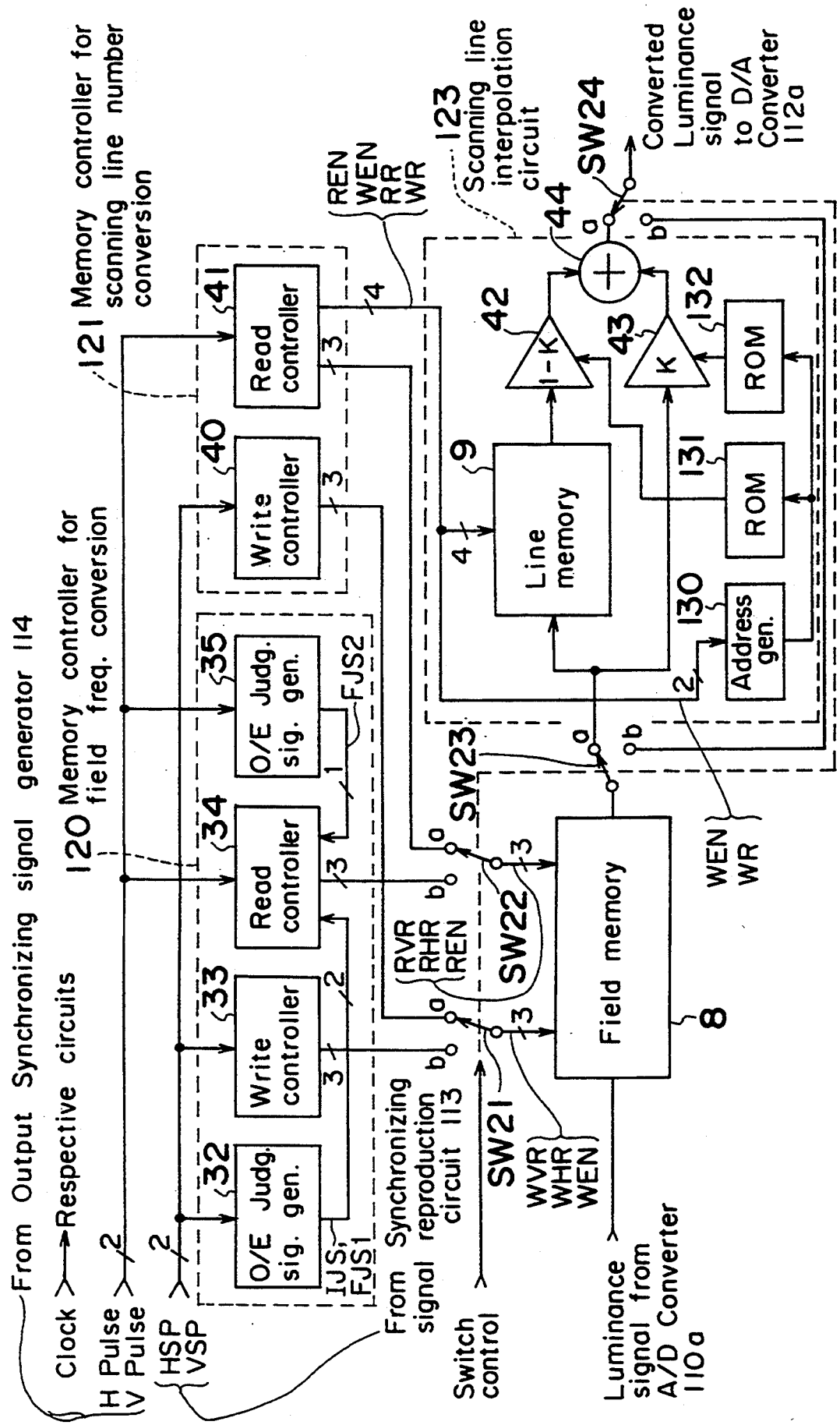
FIG. 4 is a schematic block diagram of a luminance signal converter 111a shown in FIG. 2.

FIG. 4 shows the luminance signal converter 111a shown in FIG. 2.

Referring to FIG. 4, the luminance signal converter 111a comprises the field memory 8 of dual port serial type for storing a luminance signal of one field, the line memory 9 of dual port serial type for storing a luminance signal of one scanning line to delay the luminance signal by one scanning line, the switches SW21 to SW24, a memory controller 120 for field frequency conversion, a memory controller 121 for scanning line number conversion, and a scanning line interpolation circuit 123.

The field memory 8 is of dual port serial type and has a serial data input terminal and a serial signal output terminal. The luminance signal from the A/D converter 110a is inputted to the serial data input terminal of the field memory 8, and then, is stored therein when a write enabling signal WEN inputted thereto has a high level. Thereafter, the luminance signal stored in the field memory 8 is read out from the serial data output terminal thereof to the common terminal of the switch SW23 when a read enabling signal REN has the high level.

The above-mentioned switch control signal is inputted to respective control terminals of the switches SW21 to SW24. Therefore, in case of selecting the NTSC video signal, the switches SW21 to SW24 are switched over to the respective contacts (a) thereof. In this case, the memory controller 121 is selected among the memory controllers 120 and 121 in order to control the read and write operations of the field memory 8 for converting the inputted luminance signal having 525 scanning lines into the luminance signal having 625 scanning lines, and a luminance signal outputted from the field memory 8 is passed through the scanning line interpolation circuit 123 in order to perform a scanning line interpolation process, and then, the interpolated luminance signal is outputted to the D/A converter 112a.

On the other hand, in case of selecting either the PAL or SECAM video signal, the switches SW21 to SW24 are switched over to the respective contacts (b) thereof. In this case, the memory controller 120 is selected among the memory controllers 120 and 121 in order to control the read and write operations of the field memory 8 for converting the inputted luminance signal having a field frequency of 50 Hz into the luminance signal having a field frequency of 60 Hz, and the luminance signal outputted from the field memory 8 is directly outputted to the D/A converter 112a without passing the luminance signal through the scanning line interpolation circuit 123 or without performing a scanning line interpolation process.

The clock outputted from the output synchronizing signal generator 114 is inputted to the respective circuits within the luminance signal converter 111a.

The memory controller 120 for the field frequency conversion comprises an odd/even judgment signal generator (referred to as an O/E judgment signal generator hereinafter) 32, a write controller 33, a read controller 34, and an odd/even judgment signal generator (referred to as an O/E judgment signal generator hereinafter) 35. The memory controller 120 controls the field memory 8 to write the inputted luminance signal therein using memory control signals WVR, WHR and WEN, and to read out the luminance signal therefrom using memory control signals RVR, RHR and REN so that the inputted luminance signal having a field frequency of 50 Hz is converted into the luminance signal having a field frequency of 60 Hz.

The O/E judgment signal generator 32 generates not only an interlace judgment signal IJS for representing that an interlace has been caused or representing such a state that the odd field has 252 scanning lines and the even field has 253 scanning lines, but also an O/E judgment signal FJS1 for representing whether or not the current video signal is in an odd field or an even field in response to the horizontal and vertical synchronizing pulses HSP and VSP from the synchronizing signal reproduction circuit 113, and then, outputs the signals IJS1 and FJS1 to the read controller 34. The write controller 33 generates write vertical and horizontal reset signals WVR and WHR and the write enabling signal WEN in response to the horizontal and vertical synchronizing pulses HSP and VSP from the synchronizing signal reproduction circuit 113, and then, outputs the signals WVR, WHR and WEN through the contact (b) of the switch SW21 to the field memory 8.

The O/E judgment signal generator 35 generates an O/E judgment signal FJS2 for representing whether or not the current video signal is in an odd field or an even field in response to the horizontal and vertical synchronizing pulses (H and V pulses) from the output synchronizing signal generator 114, and then, outputs the signal FJS2 to the read controller 34. The read controller 34 generates read vertical and horizontal reset signals RVR and RHR and the read enabling signal REN in response to the horizontal and vertical synchronizing pulses (H and V pulses) from the output synchronizing signal generator 114, the signals IJS and FJS1 from the O/E judgment signal generator 32, and the signal FJS2 from the O/E judgment signal generator 35, and then, outputs the signals RVR, RHR and REN through the contact (b) of the switch SW22 to the field memory 8.

The memory controller 121 for the scanning number conversion comprises a write controller 40 and a read controller 41. The memory controller 121 controls the field memory 8 and the line memory 9 to write the inputted luminance signal in the field memory 8, to read out the luminance signal therefrom using memory control signals WVR, WHR and WEN, to write the luminance signal from the field memory 8 into the line memory 9 and to read out it therefrom using memory control signals REN, WEN, RR and WR, so that the inputted luminance signal having 525 scanning lines is converted into the luminance signal having 625 scanning lines.

The write controller 40 generates write the vertical and horizontal reset signals WVR and WHR and the write enabling signal WEN in response to the horizontal and vertical synchronizing pulses HSP and VSP from the synchronizing signal reproduction circuit 113, and then, outputs the signals WVR, WHR and WEN through the contact (a) of the switch SW21 to the field memory 8. The read controller 41 generates not only read vertical and horizontal reset signals RVR and RHR and the read enabling signal REN for the field memory 8, but also read and write enabling signals REN and WEN and read and write reset signals RR and WR for the line memory 9 in response to the horizontal and vertical synchronizing pulses (H and V pulses) from the output synchronizing signal generator 114, and then, outputs the signals RVR, RHR and REN through the contact (a) of the switch SW22 to the field memory 8 and outputs the signals REN, WEN, RR and WR to the scanning line interpolation circuit 123.

It is to be noted that the color signal converter 111b shown in FIG. 2 is constituted in a manner similar to that of the luminance signal converter 111a shown in FIG. 4.

Figure 5:
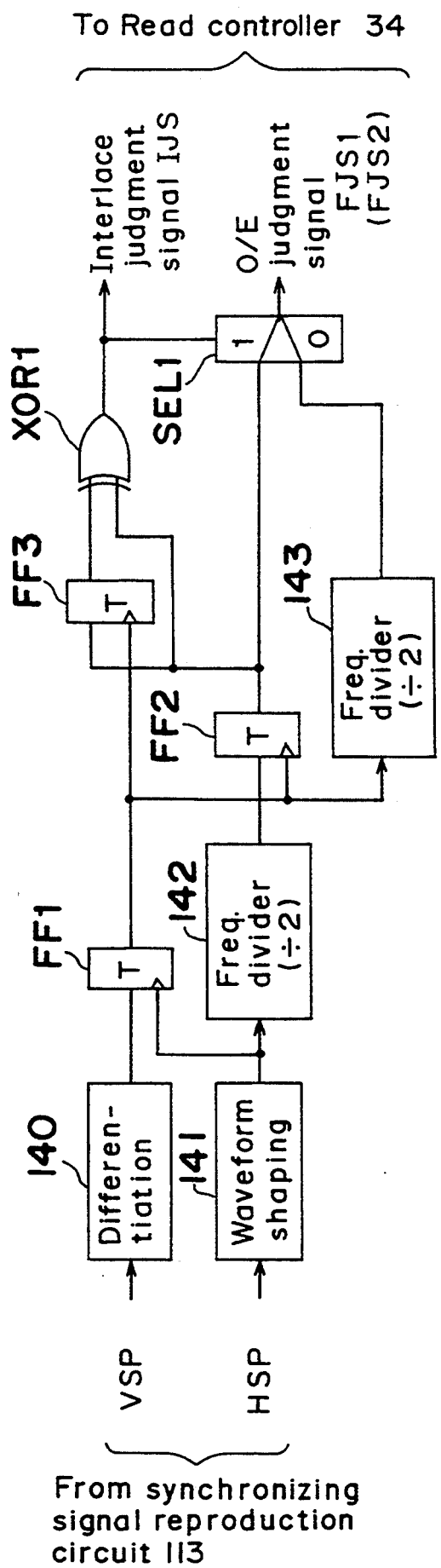
FIG. 5 is a schematic block diagram of an odd/even judgment signal generator 32 or 35 shown in FIG. 2.

FIG. 5 shows the O/E judgment signal generator 32 shown in FIG. 2.

Referring to FIG. 5, the O/E judgment signal generator 32 comprises a differentiation circuit 140, a waveform shaping circuit 141, frequency dividers 142 and 143 each having a division factor of two, delay type flip flops FF1, FF2 and FF3, an exclusive OR gate XOR1, and a selector SEL1. Each of the flip flops FF1, FF2 and FF3 latches an inputted signal therein at a leading edge of the signal inputted to the clock input terminal, and thereafter, outputs the stored signal at the next leading edge of the signal inputted to the clock input terminal. It is to be noted that each of delay type flip flops FF11, FF21 to FF24 and FF31 as described later operates in a manner similar to that of the flip flops FF1 to FF3.

The vertical synchronizing pulse VSP from the synchronizing signal reproduction circuit 113 is inputted through the differentiation circuit 140 and the flip flop FF1 to the frequency divider 143 and respective clock input terminals of the flip flops FF2 and FF3. On the other hand, the horizontal synchronizing pulse HSP from the synchronizing signal reproduction circuit 113 is inputted through the waveform shaping circuit 141 to the frequency divider 142 and the clock input terminal of the flip flop FF1. The waveform shaping circuit 141 generates and outputs a pulse signal having a predetermined pulse width smaller than that of the horizontal synchronizing pulse HSP inputted thereto in response to the inputted horizontal synchronizing pulse HSP. The frequency divider 142 divides the frequency of the inputted signal and generates and outputs a signal having half the frequency of the inputted signal through the flip flop FF2 to the flip flop FF3, the second input terminal of the exclusive OR gate XOR1, and the first input terminal of the selector SEL1. A signal outputted from the flip flop FF3 is outputted to the first input terminal of the exclusive OR gate XOR1. Further, the frequency divider 143 divides the frequency of the inputted signal, generates and outputs a signal having half the frequency of the inputted signal to the second input terminal of the selector SEL1.

The exclusive OR gate XOR1 outputs an interlace judgment signal IJS to the selection control terminal of the selector SEL1 and the read controller 34. When the interlace judgment signal IJS has the high level, the selector SEL1 outputs the inputted signal from the flip flop FF2 as the O/E judgment signal FJS1 to the read controller 34. On the other hand, when the interlace judgment signal IJS has a low level, the selector SEL1 outputs the inputted signal from the frequency divider 143 as the O/E judgment signal FJS1 to the read controller 34.

In the O/E judgment signal generator 32 constituted as described above, the inputted vertical synchronizing pulse VSP is latched by the flip flop FF1 at a leading edge of the horizontal synchronizing pulse HSP, so as to generate a vertical synchronizing pulse having a pulse width of 262 H in an odd field and another vertical synchronizing pulse having a pulse width of 263 H in an even field. When an interlace has been caused, the frequency-divided signal of the horizontal synchronizing pulse HSP from the frequency divider 142 is latched by the flip flop FF2 at a leading edge of the synchronizing pulse signals of 262H and 263H, so as to generate and output the O/E judgment signal FJS1. On the other hand, when no interlace has been caused, the frequency-divided signal of the vertical synchronizing pulse VSP is outputted through the selector SEL1 as the O/E judgment signal FJS1. It is to be noted that the O/E judgment signal FJS1 having the high level represents that the current luminance signal is in an even field, and the O/E judgment signal FJS1 having the low level represents that the current luminance signal is in an odd field.

Further, the O/E judgment signal generator 35 shown in FIG. 2 is constituted in a manner similar to that of the O/E judgment signal generator 32 shown in FIG. 5, generates and outputs the O/E judgment signal FJS2 corresponding to the O/E judgment signal FJS1 to the read controller 34 in response to the vertical and horizontal synchronizing pulses VSP and HSP from the output synchronizing signal generator 114.

Figure 6:
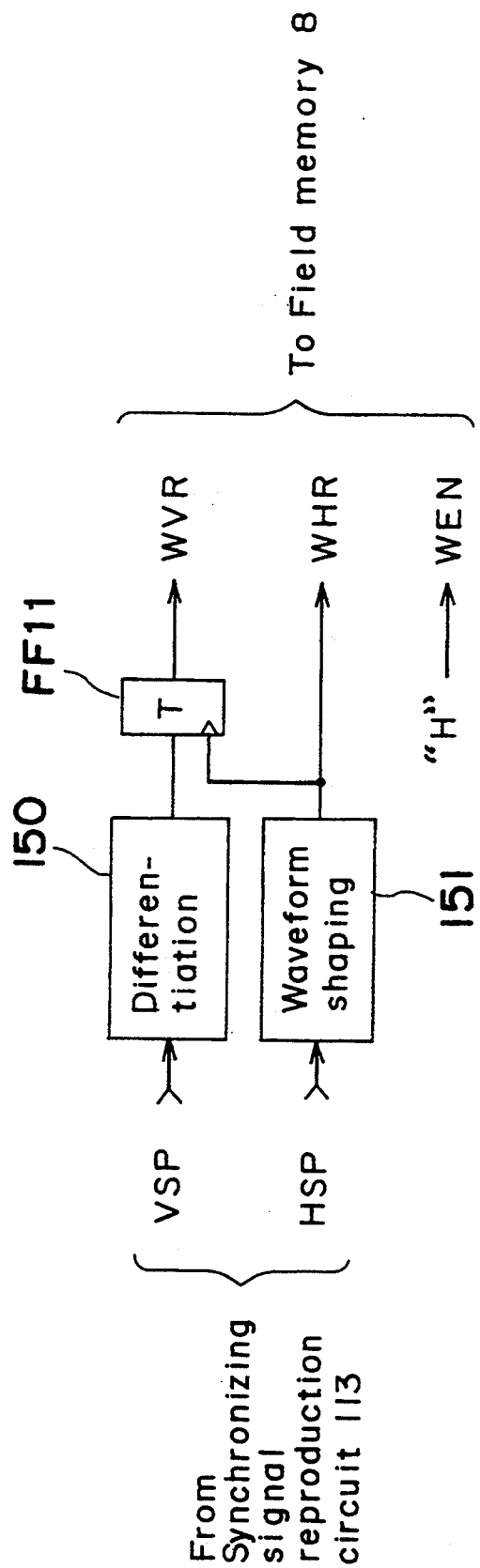
FIG. 6 is a schematic block diagram of a write controller 33 or 40 for controlling a field memory 8 shown in FIG. 2.

FIG. 6 shows the write controller 33 for controlling the field memory 8 shown in FIG. 2.

Referring to FIG. 6, the write controller 33 comprises a differentiation circuit 150, a waveform shaping circuit 151, and a delay type flip flop FF11. The vertical synchronizing pulse VSP from the synchronizing signal reproduction circuit 113 is inputted through the differentiation circuit 150 to the flip flop FF11, and the horizontal synchronizing pulse HSP is inputted through the waveform shaping circuit 151 to the clock input terminal of the flip flop FF1.

In the write controller 40 constituted as described above, the vertical synchronizing pulse VSP is delayed by the flip flop FF11, and then, is outputted as the write vertical reset signal WVR to the field memory 8. Also, the signal outputted from the waveform shaping circuit 151 is outputted as the write horizontal reset signal WHR to the field memory 8. Further, a high level signal which is made by a voltage power source (not shown) is outputted as the write enabling signal WEN to the field memory 8.

It is to be noted that the write controller 40 shown in FIG. 2 is constituted in a manner similar to that of the write controller 33 shown in FIG. 6, generates and outputs the read vertical and horizontal reset signals RVR and RHR and the read enabling signal REN to the field memory 8.

Figure 7:
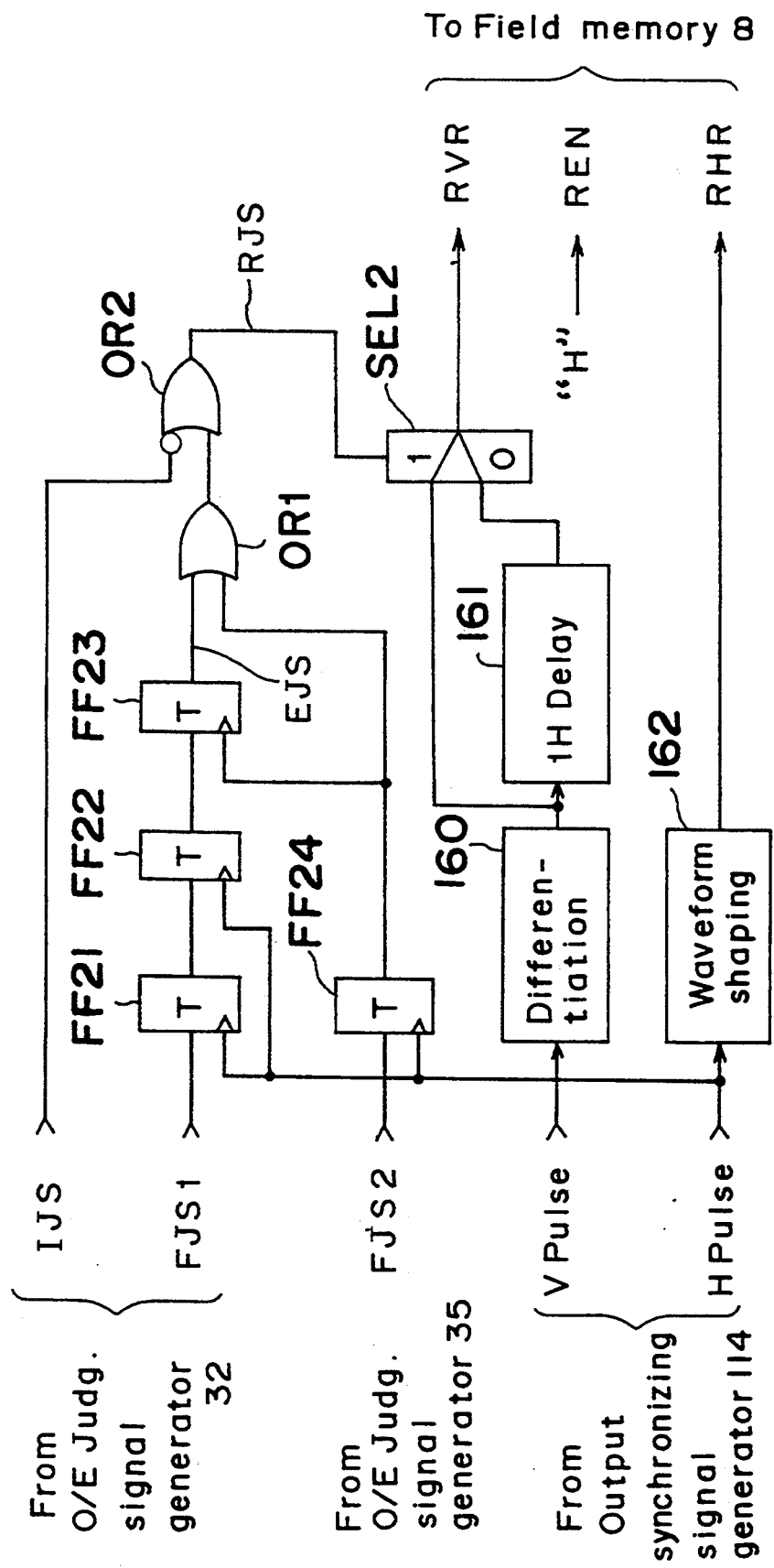
FIG. 7 is a schematic block diagram of a read controller 34 for controlling the field memory 8 shown in FIG. 2.

FIG. 7 shows the read controller 34 for controlling the field memory 8 shown in FIG. 2.

Referring to FIG. 7, the read controller 34 comprises a differentiation circuit 160, a 1 H delay circuit 161, a waveform shaping circuit 162, delay type flip flops FF21, FF22, FF23 and FF24, OR gates OR1 and OR2, and a selector SEL2.

The interlace judgment signal IJS from the O/E judgment signal generator 32 is inputted to the inverted input terminal of the OR gate OR2. The O/E judgment signal FJS1 from the O/E judgment signal generator 32 is inputted through the flip flops FF21, FF22 and FF23, which are connected in series, to the first input terminal of the OR gate OR1. It is to be noted that a judgment signal outputted from the flip flop FF23 is denoted by EJS. Further, the O/E judgment signal FJS2 from the O/E judgment signal generator 35 is inputted through the flip flop FF24 to the clock input terminal of the flip flop FF23 and the second input terminal of the OR gate OR1, the output terminal of which is connected to the second input terminal of the OR gate OR2. The OR gate OR2 outputs a replace judgment signal RJS for representing whether or not scanning lines of an even field have been replaced by scanning lines of an odd field, to the selection control terminal of the selector SEL2.

Figure 12A:
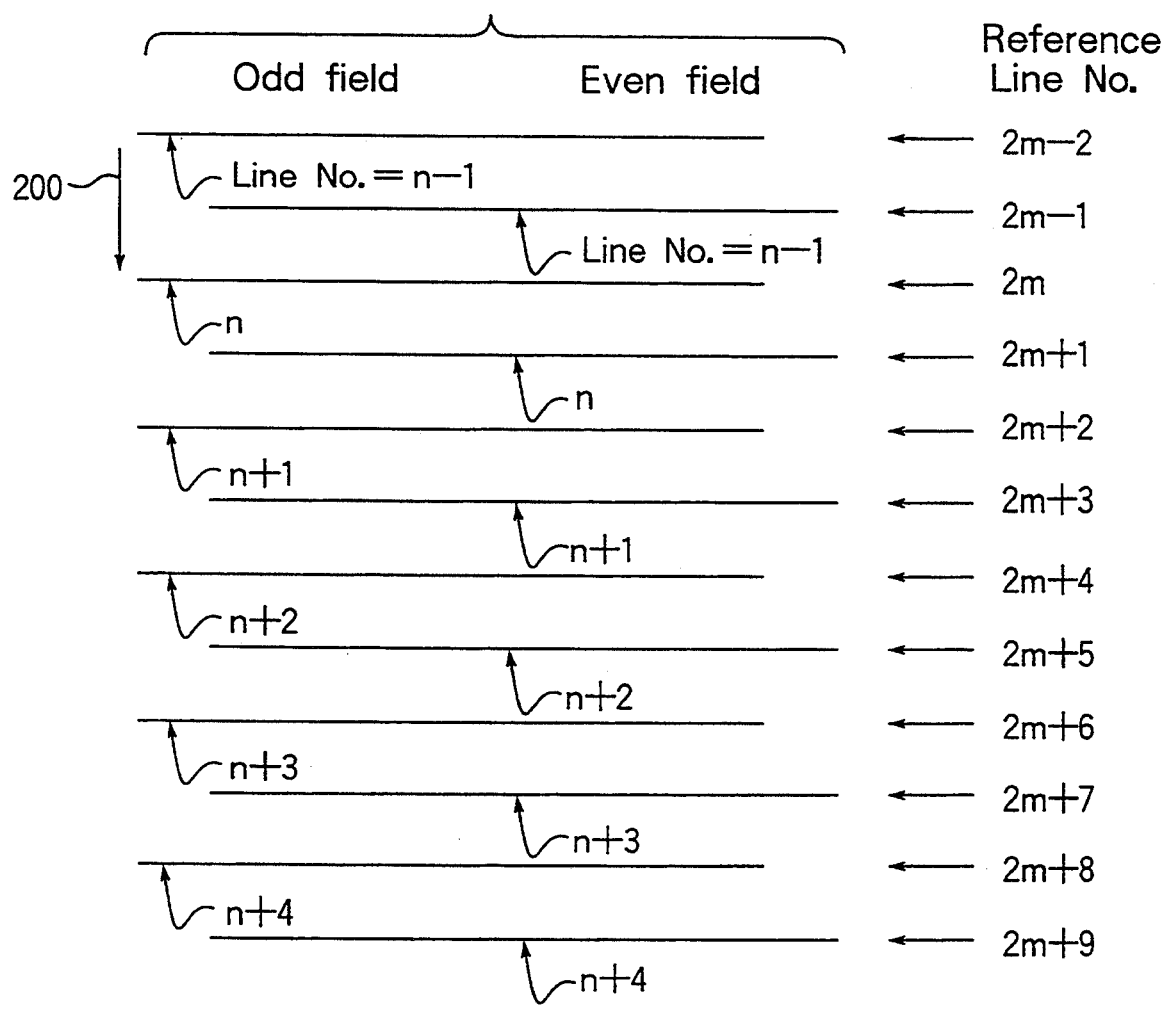
FIG. 12a is a front elevational view of one example of displayed horizontal scanning lines, wherein scanning lines of an even field is replaced with scanning lines of an odd field.
Figure 12B:
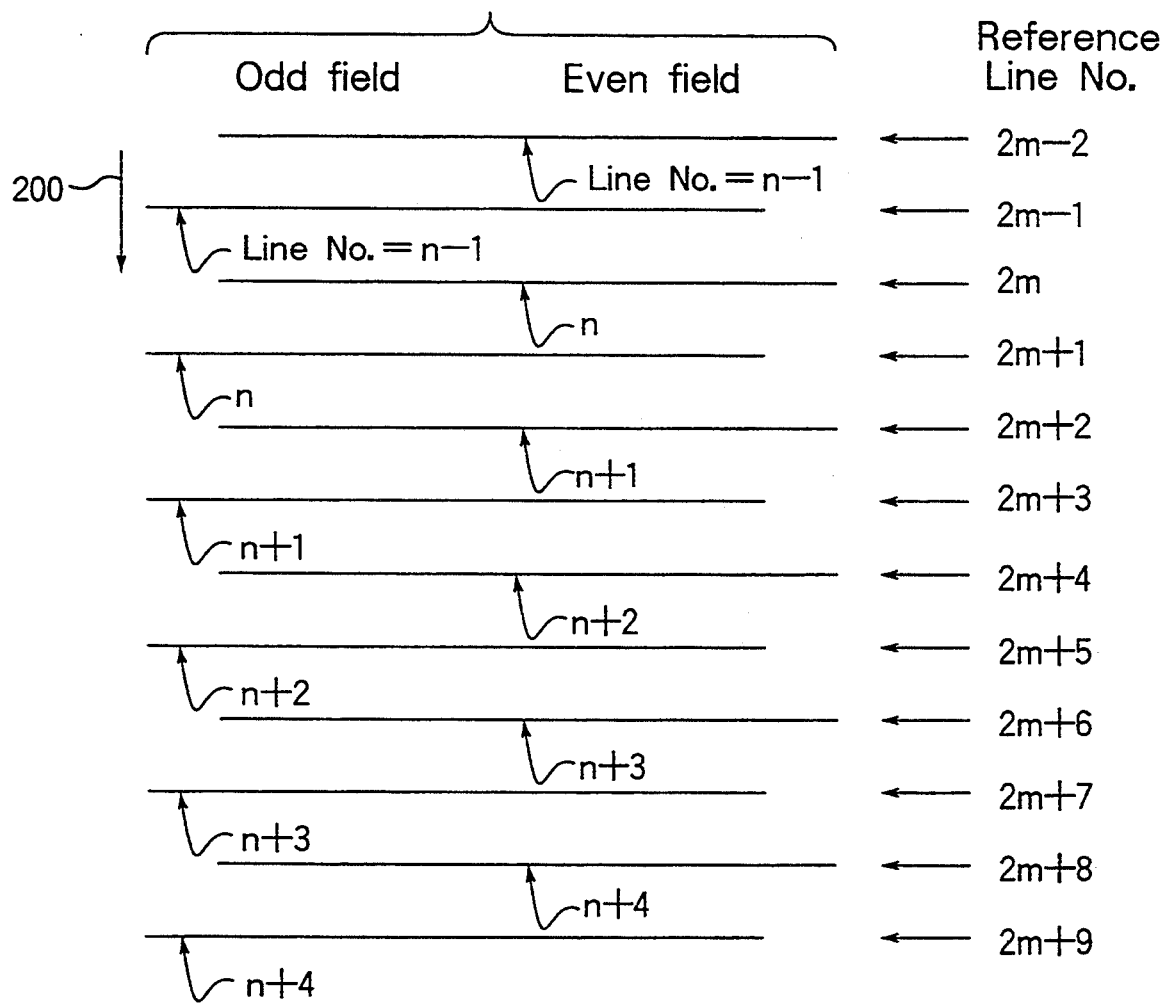
FIG. 12b is a front elevational view of another example of horizontal scanning lines which have been corrected by a control circuit of the first preferred embodiment so that the scanning lines of the odd and even fields are sequentially displayed in a predetermined manner on a CRT display unit shown in FIG. 2.

The delay representing signal RJS having the high level represents that scanning lines of an even field have not been replaced by scanning lines of an odd field, or that the scanning lines of the even and odd fields are scanned and displayed in a predetermined manner on the CRT display unit 106 in a predetermined manner of the CRT display unit 106 as shown in FIG. 12b. On the other hand, the delay representing signal RJS having the low level represents that scanning lines of an even field have been replaced by scanning lines of an odd field, or that the scanning lines of the even field are delayed by one scanning line as compared with the scanning lines of the odd field, as shown in FIG. 12a. In FIGS. 12a and 12b, 200 denotes a subscan direction in the CRT display unit 106, and each of reference line numbers indicated on the right side thereof represents a serial number of each of the horizontal scanning lines when displaying an image on the CRT display unit 106. In FIGS. 12a and 12b, each of m and n is a natural number.

The vertical synchronizing pulse V Pulse from the output synchronizing signal generator 114 is inputted through the differentiation circuit 160 to the first input terminal of the selector SEL2 and the 1 H delay circuit 161. The 1 H delay circuit 161 delays the inputted signal by one horizontal scanning line, and outputs the delayed signal to the second input terminal of the selector SEL2. The horizontal synchronizing pulse H Pulse from the output synchronizing signal generator 114 is inputted to the respective clock input terminals of the flip flops FF21, FF22 and FF24, and also is inputted to the waveform shaping circuit 162. In response to the inputted horizontal synchronizing pulse H Pulse from the output synchronizing signal generator 114, the waveform shaping circuit 162 generates and outputs a pulse signal having a predetermined pulse width smaller than that of the horizontal synchronizing pulse H Pulse inputted thereto as the read horizontal reset signal RHR to the field memory 8.

Figure 13A:
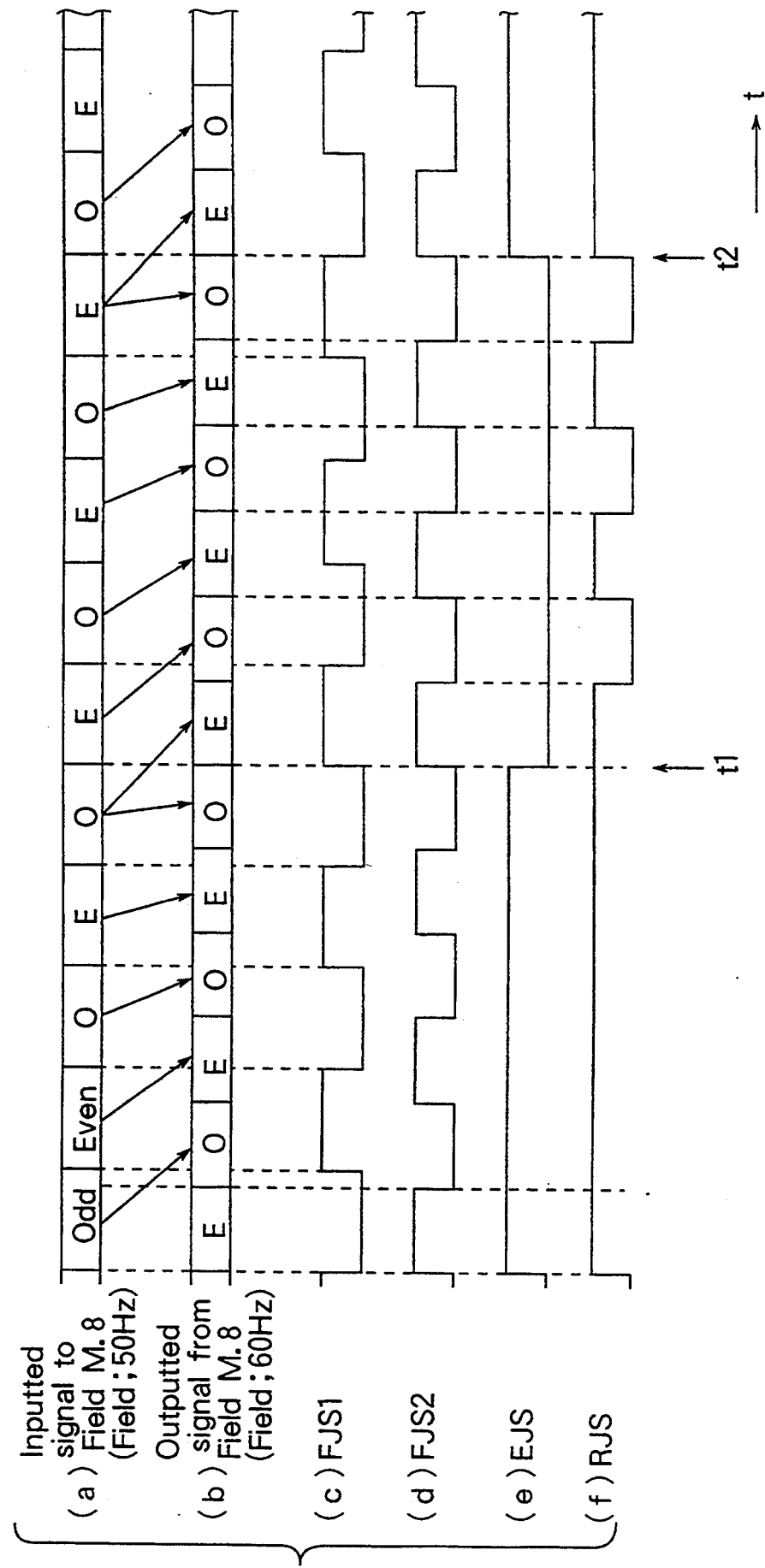
FIG. 13a is a timing chart of respective signals showing respective operations of a memory controller 114 and the field memory 8 shown in FIG. 4 to convert a luminance signal having a field frequency of 50 Hz into a luminance signal having a field frequency of 60 Hz.

As shown in FIG. 13a, when the replace judgment signal RJS has the high level or the scanning lines of the odd field have been replaced by the scanning lines of the even field as shown in FIG. 12a, the selector SEL2 selects and outputs the output of the differentiation circuit 160 as the read vertical reset signal RVR to the field memory 8. On the other hand, when the replace judgment signal RJS has the low level or any scanning line of the odd field has not been replaced by the scanning line of the even field as shown in FIG. 12b, the selector SEL2 selects and outputs the output of the 1 H delay circuit 161 or the vertical synchronizing pulse V Pulse which has been delayed by one scanning line by the 1 H delay circuit 161, as the read vertical reset signal RVR to the field memory 8. Further, a signal having the high level outputted from the voltage power source (not shown) is outputted as the read enabling signal REN to the field memory 8.

Figure 8:
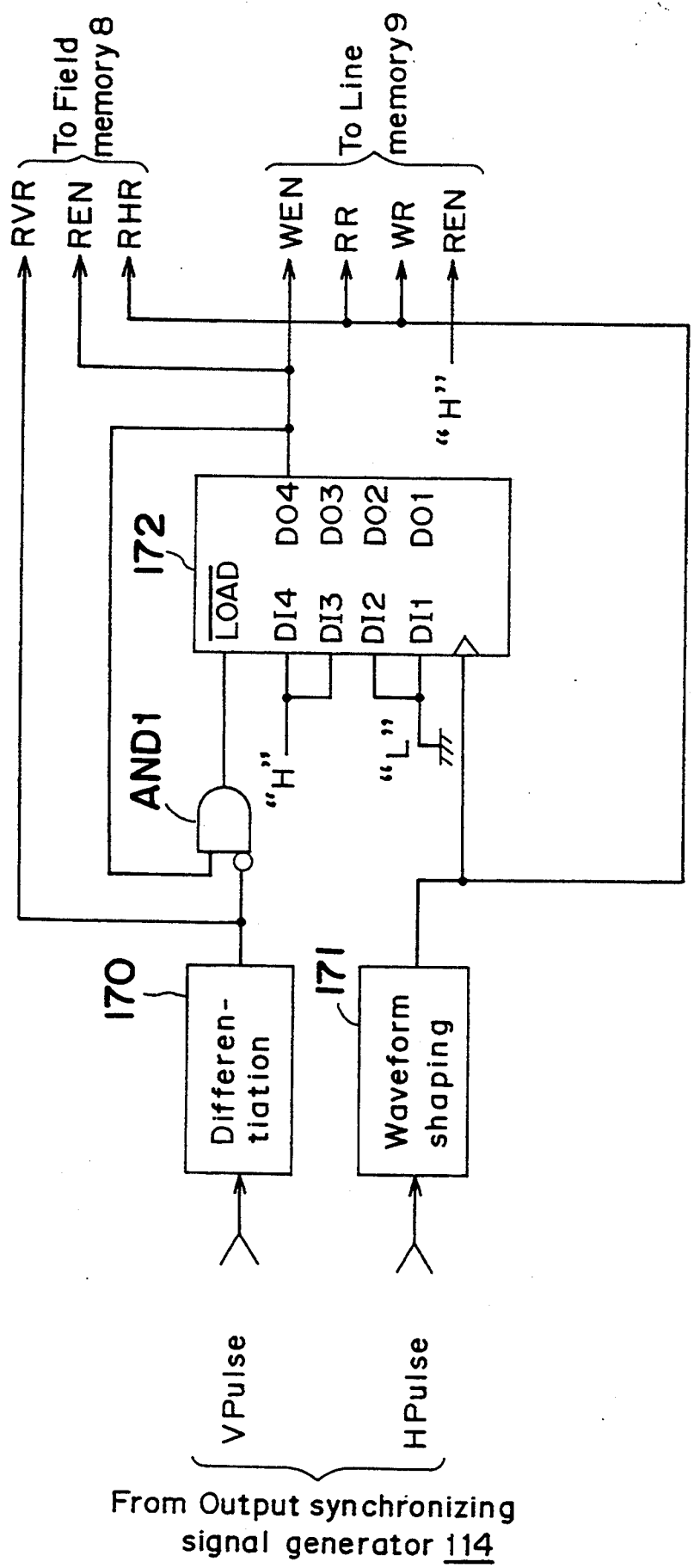
FIG. 8 is a schematic block diagram of a read controller 41 for controlling the field memory 8 and a line memory 9 shown in FIG. 2.

FIG. 8 shows the read controller 41 for controlling the field memory 8 and the line memory 9 shown in FIG. 2.

Referring to FIG. 8, the read controller 41 comprises a differentiation circuit 170, a waveform shaping circuit 171, a four bit down counter 172, and an AND gate AND1.

The vertical synchronizing pulse (V Pulse) from the output synchronizing signal generator 114 is inputted through the differentiation circuit 170 to the inverted second input terminal of the AND gate AND1, and a signal outputted from the differentiation circuit 170 is outputted as the read vertical reset signal RVR to the field memory 8. The output terminal of the AND gate AND1 is connected to a load input terminal $\overline{LOAD}$ of the down counter 172. On the other hand, the horizontal synchronizing pulse (H Pulse) from the output synchronizing signa generator 114 is inputted through the waveform shaping circuit 171 to the clock input terminal of the down counter 172, and the waveform shaping circuit 171 generates and outputs a pulse signal having a predetermined pulse width smaller than that of the horizontal synchronizing pulse H Pulse inputted thereto, as not only the read horizontal reset signal RHR to the field memory 8 but also the read and write reset signals RR and WR to the line memory 9.

The least significant two bits DI1 and DI2 of the input data terminal of the down counter 172 are connected to the ground having the low level, and the most significant two bits DI3 and DI4 of the input data terminal of the down counter 172 are connected to the voltage power source (not shown) having the high level. The most significant bit DO4 of the output data terminal of the down counter 172 is connected to the first input terminal of the AND gate AND1. A. signal outputted from the most significant bit DO4 thereof is outputted as the read enabling signal REN to the field memory 8, and is also outputted as the write enabling signal WEN to the line memory 9. Further, the high level signal outputted from the voltage power source (not shown) is outputted as the read enabling signal REN to the line memory 9.

Figure 13B:
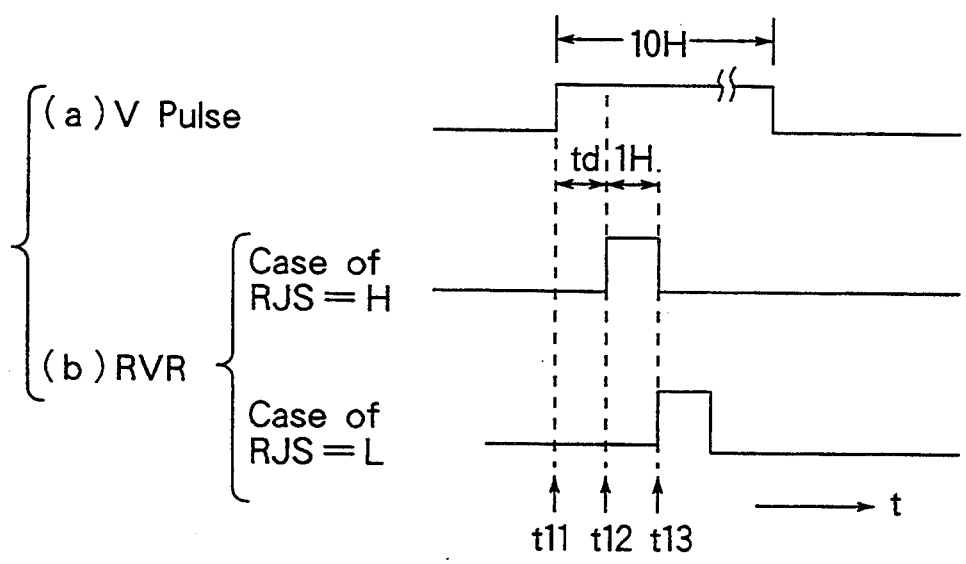
FIG. 13b is a timing chart of respective signals showing a read control operation of the filed memory 8 to delay a read operation of a luminance signal by one horizontal scanning line.

Hereinafter, the write and read operations of the field memory 8 will be described with reference to FIGS. 13a and 13b. FIG. 13a shows respective signals showing respective operations of the memory controller 114 and the field memory 8 shown in FIG. 4 to convert a luminance signal having a field frequency of 50 Hz into a luminance signal having a field frequency of 60 Hz;

(a) and (b) of FIG. 13a show a relationship between the odd and even fields when writing the luminance signal in the field memory 8 and reading out the luminance signal therefrom. At each of timings t1 and t2, the same luminance signal of one field is read out from the field memory 8. Therefore, the scanning lines of the odd field may be periodically replaced with the scanning lines of the even field.

(c) and (d) of FIG. 13a show the O/E judgment signals FJS1 and FJS2. The O/E judgment signal FJS1 having the high level represents that the current luminance signal is in an even field, and the O/E judgment signal FJS1 having the low level represents that the current luminance signal is in an odd field. Also, the O/E judgment signal FJS2 represents the field of the current luminance signal in a manner similar to that of the O/E judgment signal FJS1.

The read controller 34 shown in FIG. 7 generates the replace judgment signal RJS for representing whether or not the scanning lines of the even field have been replaced by the scanning lines of the odd field. If the scanning lines of the even field have been replaced by the scanning lines of the odd field, the scanning lines of the even field are delayed by one scanning line as compared with the scanning lines of the odd field, as shown in FIG. 12a.

In order to the above-mentioned problems, in the preferred embodiment, the read operation of the luminance signal of the odd field from the field memory 8 is delayed by one scanning line when the scanning lines of the even field are replaced with the scanning lines of the odd field. Namely, as shown in FIGS. 7 and 13a, the replace judgment signal RJS is generated based on the O/E judgment signal FJS1 and FJS2. In this case, when the replace judgment signal RJS has the high level, the vertical synchronizing pulse (V Pulse) is outputted through the differentiation circuit 160 and the selector SEL2 as the read vertical reset signal RVR, i.e., both the read vertical and horizontal reset signals RVR and RHR are not delayed. On the other hand, when the replace judgment signal RJS has the low level, the luminance signal stored in the field memory 8 is read out therefrom based on the read vertical reset signal RVR at a timing t13 of a leading edge of the read vertical reset signal RVR which is delayed by the time interval of one scanning line from a predetermined timing t12 delayed by a time interval td from a timing t11 of a leading edge of the vertical synchronizing pulse (V Pulse), as shown in FIG. 13b.

Referring back to FIG. 4, the scanning line interpolation circuit 123 will be described below.

In case of selecting the NTSC signal, the switches SW21 to SW24 are switched over to the respective contacts (a) thereof in response to the switch control signal. In this case, the field memory 8 is used for converting the inputted luminance signal having 525 scanning lines into the luminance signal having 625 scanning lines, as described above.

The scanning line interpolation circuit 123 comprises the line memory 9 for interpolating the scanning line, an amplifier 42 with a variable amplification factor $(1-K)$ which is used for weighing of conversion of the number of the scanning lines, an amplifier 43 with a variable amplification factor K which also is used for weighing of conversion of the number of the scanning lines, an adder circuit 44 for adding two luminance signals of two scanning line weighted by the amplifiers 42 and 43, a ROM 131 for previously storing data of the amplification factor $(1-K)$ and setting them in the amplifier 42, a ROM 132 for previously storing data of the amplification factor K and setting them in the amplifier 43, and an address generator 130 for generating addresses of the ROMs 131 and 132 in response to the signals WEN and WR.

The line memory 9 is of dual port type and has a serial data input terminal and a serial signal output terminal.

The luminance signal read out from the field memory 8 is inputted through the contact (a) of the switch SW23 to the signal input terminal of the line memory 9, and also is inputted from the switch SW23 through the amplifier 43 to the second input terminal of the adder circuit 44. The luminance signal is stored in the line memory 9 when the write enabling signal WEN inputted thereto has the high level. Thereafter, the luminance signal stored in the line memory 9 is read out from the serial data output terminal thereof through the amplifier 42 to the first input terminal of the adder circuit 44 when the read enabling signal REN has the high level. The adder circuit 44 adds the signals respectively inputted to the first and second input terminals thereof, and outputs a signal having a level of the sum result as an interpolated or converted luminance signal through the contact (a) of the switch SW24 to the D/A converter 112a.

It is to be noted that the contact (b) of the switch SW23 is connected to the contact (b) of the switch SW24.

Figure 14:
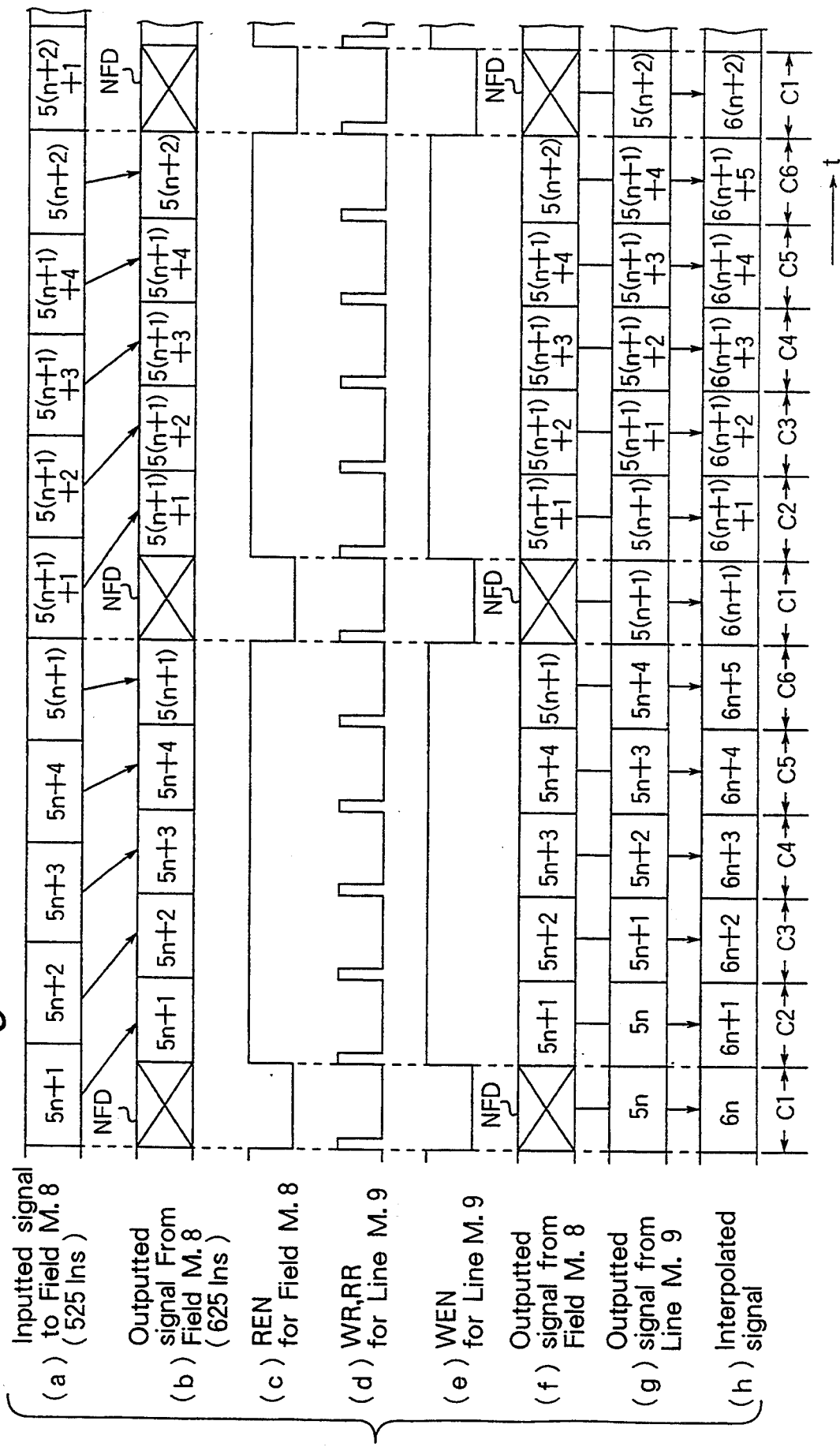
FIG. 14 is a timing chart of respective signals showing respective operations of a memory controller 121, the field memory 8 and a line memory 9 shown in FIG. 4 to convert a luminance signal having 525 horizontal scanning lines into a luminance signal having 625 horizontal scanning lines.

As shown in FIG. 14, a time interval from a timing of a trailing edge of the write enabling signal WEN and a leading edge of the write reset signal WR to the next leading edge of the write reset signal WR is defined as a time interval C1 corresponding to a time interval of one field of the luminance signal read out from the line memory 9. Further, there are sequentially defined five time intervals C2 to C6 following the time interval C1, continuously, each of the time intervals C2 to C6 corresponding to each time interval of one field of the luminance signal read out from the line memory 9.

In response to the write enabling signal WEN and the write reset signal WR from the read controller 41, the address generator 130 generates and outputs addresses of the ROMs 131 and 132 to respective address terminals of the ROMs 131 and 132, by each of the time intervals C1 to C6, so that the ROMs 131 and 132 respectively output and set in the amplifiers 42 and 43 data of the amplification factors $(1-K)$ and K shown in Table 1.

The operation of the conversion of the number of the scanning lines of the scanning line interpolation circuit 123 constituted as described above will be described below with reference to FIGS. 4 and 14.

FIG. 14 is a timing chart of respective signals showing respective operations of the memory controller 121, the field memory 8 and the line memory 9 shown in FIG. 4.

In the conversion of the number of the scanning lines, a luminance signal having 525 scanning lines is converted into the luminance signal having 625 scanning lines by controlling the field memory 8 to write therein the inputted luminance signal using the control signals WVR, WHR and WEN from the write controller 40, and to read therefrom the written luminance signal using the control signals RVR, RHR and REN from the read controller 41. Thereafter, the luminance signal read out from the field memory 8 is passed through the line memory 8 so as to be delayed by one scanning line, and then, the delayed luminance signal and the not-delayed luminance signal are respectively amplified by the amplifiers 42 and 43 with amplification factors $(1-K)$ and K set by the ROMs 131 and 132. Then, both the luminance signals outputted from the amplifiers 42 and 43 are added to each other so as to interpolate the luminance signal of one scanning line.

Referring to FIG. 14, the inputted luminance signal having 525 scanning lines shown in (a) of FIG. 14 is converted into the luminance signal having 625 scanning lines shown in (b) of FIG. 14. In this control of the field memory 8, the frequency of the clock for reading out the stored luminance signal which is inputted from the read controller 41 to the field memory 8 is set to 6/5 times the frequency of the clock for writing the inputted luminance signal therein, and the read enabling signal REN is set to the low level for a time interval of the first one scanning line by six scanning line of the read clock, as shown in (c) of FIG. 14, so that the luminance signal is inhibited from being read out therefrom or not-defined luminance signal NFD is inserted into the luminance signal to be outputted from the field memory 8, as shown in (f) of FIG. 14.

In the preferred embodiment, the frequency of the clock for reading out the stored luminance signal is set to the frequency of the clock for writing the inputted luminance signal therein which is multiplied by a predetermined multiplier of 6/5. However, the present invention is not limited to this. The predetermined multiplier is preferably set to a value larger than one depending on a ratio of the number of scanning lines of the written video signal into the field memory 8 to the number of scanning lines of the read video signal therefrom. For example, the predetermined multiplier may be set to 625/525.

In the control of the line memory 9, there are used the write and read reset signals RR and WR are generated by the read controller 41. In this case, in order to inhibit the luminance signal from being written in the line memory 9 for the above-mentioned time interval of the not-defined luminance signal NFD having no data, as shown in Fig. (e) of FIG. 14, the write enabling signal REN is set to the low level for this time interval. Thereafter, the luminance signal outputted from the field memory 8 and the luminance signal delayed by one scanning line by the line memory 9 are weighted with predetermined weighing factors corresponding to the amplification factors $(K-1)$ and K by the amplifiers 42 and 43, and then, both the weighted luminance signals are added to each other so as to output an interpolated luminance signal, as shown in (h) of FIG. 14. It is to be noted that the weighing factors or the amplification factors $(K-1)$ and K which are altered by one scanning line of the read clock and correspond to the time intervals C1 to C6 are set as shown in Table 1.

In the multi-system type television set of the first preferred embodiment according to the present invention constituted as described above, for example, in case of selecting a broadcast wave of the NTSC signal, the broadcast wave thereof is received by the antenna 100 and is inputted through the tuner 101, the VIF amplifier and demodulator 102a, the Y/C separation circuit 104a and the A/D converters 110a and 110b to the luminance signal converter 111a and the color signal converter 111b. Then, the luminance signal converter 111a converts an inputted luminance signal having 525 scanning lines and a field frequency of 60 Hz into the luminance signal having the 625 scanning lines and a field frequency of 60 Hz corresponding to the inputted luminance signal, and then, outputs the converted luminance signal through the D/A converter 112a to the RGB matrix circuit 105. On the other hand, the color signal converter 111b converts an inputted color signal having 525 scanning lines and a field frequency of 60 Hz into the color signal having the 625 scanning lines and a field frequency of 60 Hz corresponding to the inputted color signal, and then, outputs the converted color signal through the D/A converter 112b to the RGB matrix circuit 105. Thereafter, an image of the NTSC signal including the converted luminance and color signals is displayed on the CRT display unit 106 with 625 scanning lines and a field frequency of 60 Hz, in a manner similar to that known to those skilled in the art.

Further, for example, in case of selecting a broadcast wave of the PAL signal, the broadcast wave thereof is received by the antenna 100 and is inputted through the tuner 101, the VIF amplifier and demodulator 102b, the Y/C separation circuit 104b and the A/D converters 110a and 110b to the luminance signal converter 111a and the color signal converter 111b. Then, the luminance signal converter 111a converts an inputted luminance signal having a field frequency of 50 Hz and 625 scanning lines into the luminance signal having a field frequency of 60 Hz and the 625 scanning lines corresponding to the inputted luminance signal, and then, outputs the converted luminance signal through the D/A converter 112a to the RGB matrix circuit 105. On the other hand, the color signal converter 111b converts an inputted color signal having a field frequency of 50 Hz and 625 scanning lines into the color signal having a field frequency of 60 Hz and the 625 scanning lines corresponding to the inputted color signal, and then, outputs the converted color signal through the D/A converter 112b to the RGB matrix circuit 105. Thereafter, an image of the PAL signal including the converted luminance and color signals is displayed on the CRT display unit 106 with 625 scanning lines and a field frequency of 60 Hz, in a manner similar to that known to those skilled in the art.

Thus, various kinds of video signals having field frequency different from each other and having scanning lines different from each other can be displayed on one CRT display unit 106 without convergence and geometric distortions such as the so-called bobbin winder distortion or the like, and without deterioration of the quality of image to be displayed thereon.

Namely, the features of the first preferred embodiment are to convert a video signal into another video signal including information of the video signal having the maximum field frequency and the maximum number of the scanning lines among the video signals to be processed in this apparatus, wherein the CRT display unit 106 is made so as to operate with the maximum field frequency and the maximum number of the scanning lines.

SECOND PREFERRED EMBODIMENT

A multi-system type television set of the second preferred embodiment according to the present invention is characterized in that the horizontal and vertical synchronizing pulses HSP and VSP are not supplied to the output synchronizing signal generator 114 (114a in the second preferred embodiment) in the first preferred embodiment shown in FIG. 2, namely, the write and read operations are respectively performed using the clock signals different from each other, or asynchronous with each other.

Then, the write vertical reset signal WVR may be generated prior to the read vertical reset signal RVR, i.e., the write vertical reset signal WVR gets ahead of the read vertical reset signal RVR, a video signal of a first field stored in the field memory 8a or 8b is erased, and another video signal of a second field following the first field is written in the field memory 8a or 8b. On the other hand, the read vertical reset signal RVR may be generated prior to the write vertical reset signal WVR, the read vertical reset signal RVR gets ahead of the write vertical reset signal WVR, and then, a video signal of the previous field is read out from the field memory 8a or 8b.

In these cases, in particular, when a correlation between the video signals of the subsequent field video signals is relatively large, images different from each other are displayed on upper and bottom portions of the CRT display unit 106, namely, an image on a display surface is divided into two portions composed of the upper and bottom portions, resulting in displaying on the CRT display unit 106 an image not corresponding to the image of the inputted video signal. In order to solve the above problems, there is provided the second preferred embodiment.

Figure 9:
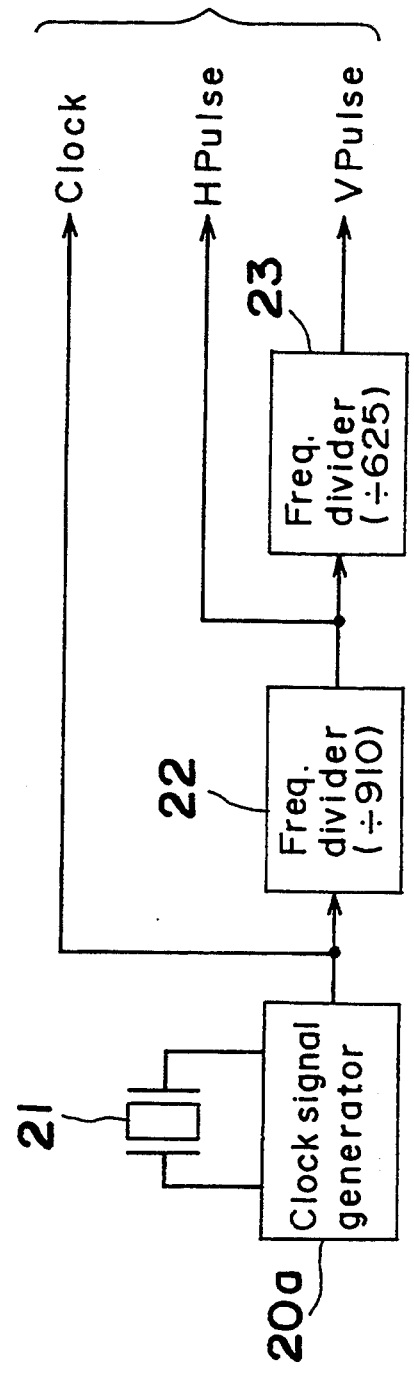
FIG. 9 is a schematic block diagram of an output synchronizing signal generator 114a of a second preferred embodiment according to the present invention.
Figure 10:
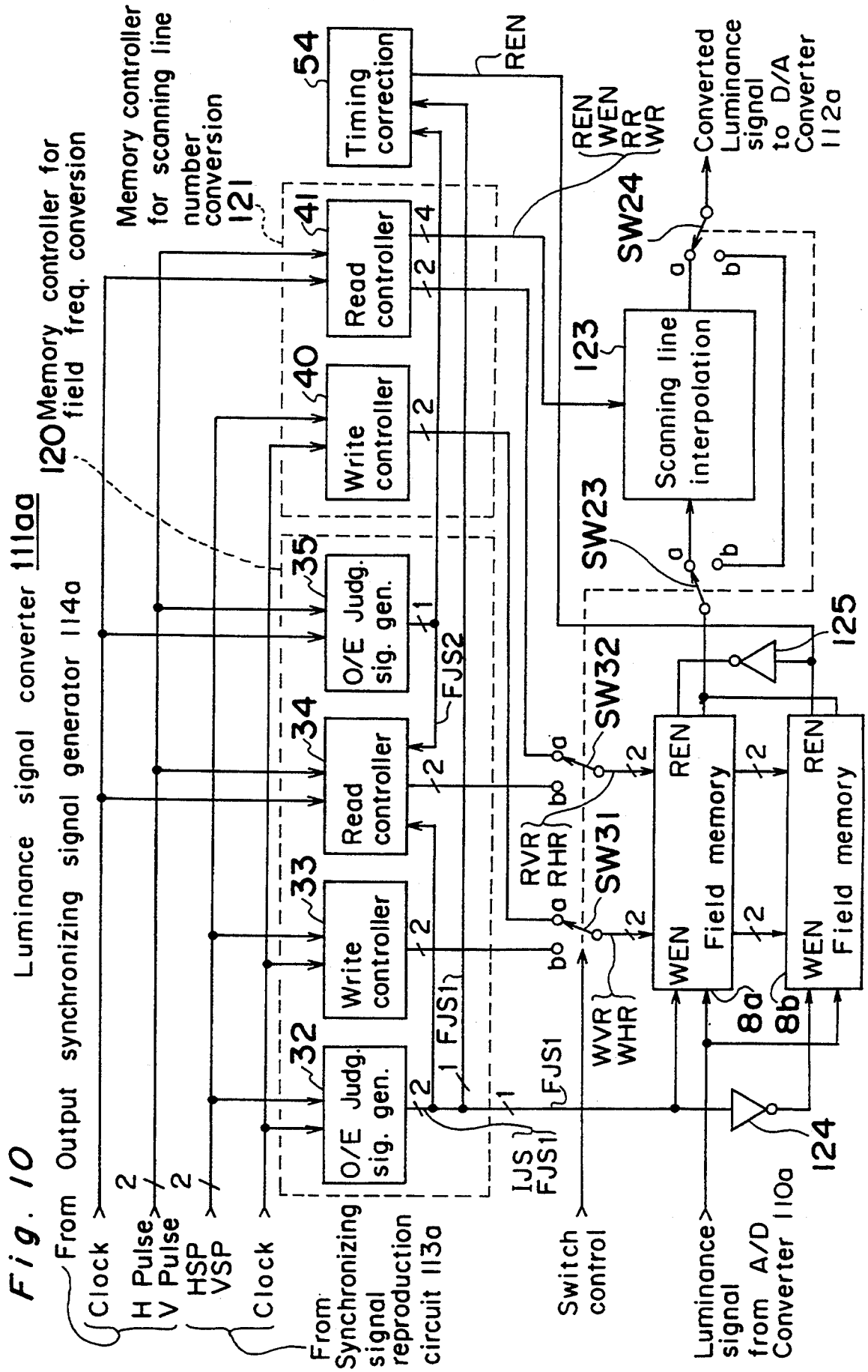
FIG. 10 is a schematic block diagram of a luminance signal converter 111aa of the second preferred embodiment.

FIG. 9 shows an output synchronizing signal generator 114a of a second preferred embodiment according to the present invention corresponding to the output synchronizing signal generator 114, and FIG. 10 shows a luminance signal converter 111aa of the second preferred embodiment corresponding to the luminance signal converter 111a.

Referring back to FIG. 2, differences between the first and second preferred embodiments are as follows:

(a) the horizontal and vertical synchronizing pulses HSP and VSP from the synchronizing signal reproduction circuit 113 are not supplied to the output synchronizing signal generator 114a;

(b) compositions of the luminance and color signal converters 111a and 111b of the first preferred embodiment are different from those of the luminance signal converter 111aa and the color signal converter (not shown) of the second preferred embodiment; and (c) there is provided a synchronizing signal reproduction circuit 113a (block is not shown in Figs. but the reference numeral 113a is shown in FIG. 10) for generating a clock in addition to the horizontal and vertical synchronizing pulses HSP and VSP, in stead of the synchronizing signal reproduction circuit 113 shown in FIG. 4. It is to be noted that the color signal converter of the second preferred embodiment is constituted in a manner similar to the luminance signal converter 111aa. The respective circuits other than the luminance and color signal generators 111a and 111b and the output synchronizing signal generator 114a are constituted in manners similar to those of the first preferred embodiment shown in FIG. 2.

In particular, as is clear from comparison between FIGS. 4 and 10, in the second preferred embodiment, there are further provided the second field memory 8b in addition to the field memory 8a, two invertors 124 and 125, and a timing correction circuit 54, in addition to the respective circuits shown in FIG. 4, and there are provided two switches SW31 and SW32 of two contacts and two circuits in stead of the switches SW21 and SW22 of two contacts and three circuits of the first preferred embodiment.

The differences between compositions of the first and second preferred embodiments will be described below with reference to FIGS. 9 to 11.

Referring to FIG. 9, the output synchronizing signal generator 114a comprises only a clock signal generator 20a having the crystal resonator 21, the frequency divider 22 and the frequency divider 23. The features of the output synchronizing signal generator 114a is provided to generate a clock and the horizontal and vertical synchronizing pulses (H and V pulses) in a free running manner.

The clock signal generator 20a generates a clock in asynchronous with the horizontal and vertical synchronizing pulses HSP and VSP, or in a free running manner so as to generate the clock having a frequency which is selected among two predetermined frequencies in response to the switch control signal depending on the selected kind of the inputted video signals, and outputs the clock to the frequency divider 22, the luminance signal converter 111aa and the color signal converter (not shown). Also, the frequency divider 22 divides the frequency of the inputted clock from the clock signal generator 20a with a division factor of 910, outputs a signal having a divided frequency to the frequency divider 23, and outputs the frequency of the divided signal as the horizontal synchronizing pulse (H pulse) to the luminance signal converter 111a, the color signal converter 111b and the deflection yoke 107. Further, the frequency divider 23 divides the frequency of the inputted signal from the frequency divider 22 with a division factor of 625, and outputs the frequency-divided signal as the vertical synchronizing pulse to the luminance signal converter 111aa, the color signal converter and the deflection yoke 107.

Referring to FIG. 10, each of the field memories 8a and 8b is of dual port type and has a serial data input terminal and a serial signal output terminal. The luminance signal from the A/D converter 110a is inputted to the respective serial data input terminals of the field memories 8a and 8b, and then, is stored therein only when the write enabling signal WEN inputted thereto has the high level. As the write enabling signal WEN, the O/E judgment signal FJS1 outputted from the O/E judgment signal generator 32 is inputted to the field memory 8a, and also is inputted through the inverter 124 to the field memory 8b. Therefore, the luminance signal of one field is inputted and written into the field memories 8a and 8b, alternately, by one field. Thereafter, the luminance signals stored in the field memories 8a and 8b are read out from the serial data output terminals thereof to the common terminal of the switch SW23 when the read enabling signal REN has the high level. The read enabling signal REN is inputted to the field memory 8b, and also is inputted through the inverter 125 to the field memory 8a. Therefore, the luminance signal of one field is read out from the field memories 8a and 8b, alternately, by one field.

The above-mentioned switch control signal is inputted to respective control terminals of the switches SW31, SW32, SW23 and SW24. Therefore, in case of selecting the NTSC video signal, these switches SW31, SW32, SW23 and SW24 are switched over to the respective contacts (a) thereof. In this case, the memory controller 121 is selected among the memory controllers 120 and 121 in order to control the read and write operations of the field memories 8a and 8b for converting the inputted luminance signal having 525 scanning lines into the luminance signal having 625 scanning lines, and a luminance signal outputted from the field memories 8a and 8b is passed through the scanning line interpolation circuit 123 in order to perform the above-mentioned scanning line interpolation process, and then, the interpolated luminance signal is outputted to the D/A converter 112a.

On the other hand, in case of selecting either the PAL or SECAM video signal, the switches SW23, SW24, SW31 and SW32 are switched over to the respective contacts (b) thereof. In this case, the memory controller 120 is selected among the memory controllers 120 and 121 in order to control the read and write operations of the field memories 8a and 8b for converting the inputted luminance signal having a field frequency of 50 Hz into the luminance signal having a field frequency of 60 Hz, and the luminance signal outputted from the field memories 8a and 8b is directly outputted to the D/A converter 112a without passing the luminance signal through the scanning line interpolation circuit 123 or without performing the above-mentioned scanning line interpolation process.

The clock outputted from the synchronizing signal reproduction circuit 113a is inputted to the O/E judgment signal generator 32 and the write controllers 33 and 40, and the clock outputted from the output synchronizing signal generator 114a is inputted to the O/E judgment signal generator 35 and the read controllers 34 and 41.

The memory controller 120 controls the field memories 8a and 8b to write the inputted luminance signal therein and to read out the luminance signal therefrom using memory control signals WVR, WHR and WEN (FJS1) so that the inputted luminance signal having a field frequency of 50 Hz is converted into the luminance signal having a field frequency of 60 Hz.

The O/E judgment signal generator 32 generates not only the interlace judgment signal IJS but also the O/E judgment signal FJS1 in response to the horizontal and vertical synchronizing pulses HSP and VSP from the synchronizing signal reproduction circuit 113a, and then, outputs the signals IJS1 and FJS1 to the read controller 34, outputs the signal FJS1 to the timing correction circuit 54 and the field memory 8a, and further, outputs the signal FJS1 through the invertor 124 to the field memory 8b. The write controller 33 generates the write vertical and horizontal reset signals WVR and WHR in response to the horizontal and vertical synchronizing pulses HSP and VSP from the synchronizing signal reproduction circuit 113a, and then, outputs the signals WVR and WHR through the contact (b) of the switch SW31 to the field memories 8a and 8b.

The O/E judgment signal generator 35 generates the O/E judgment signal FJS2 in response to the horizontal and vertical synchronizing pulses (H and V pulses) from the output synchronizing signal generator 114a, and then, outputs the signal FJS2 to the read controller 34 and the timing correction circuit 54. The read controller 34 generates read vertical and horizontal reset signals RVR and RHR in response to the horizontal and vertical synchronizing pulses (H and V pulses) from the output synchronizing signal generator 114a, the signals IJS and FJS1 from the O/E judgment signal generator 32, and the signal FJS2 from the O/E judgment signal generator 35, and then, outputs the signals RVR and RHR through the contact (b) of the switch SW32 to the field memories 8a and 8b.

The memory controller 121 controls the field memories 8a and 8b and the line memory 9 to write the inputted luminance signal in the field memories 8a and 8b using the memory control signals WVR, WHR and WEN, to read out the luminance signal therefrom using memory control signals RVR, RHR and REN, to write the luminance signal from the field memories 8a and 8b in the line memory 9 and to read out it therefrom using memory control signals REN, WEN, RR and WR, so that the inputted luminance signal having 525 scanning lines is converted into the luminance signal having 625 scanning lines.

The write controller 40 generates write the vertical and horizontal reset signals WVR and WHR in response to the horizontal and vertical synchronizing pulses HSP and VSP from the synchronizing signal reproduction circuit 113a, and then, outputs the signals WVR and WHR through the contact (a) of the switch SW31 to the field memories 8a and 8b. The read controller 41 generates not only read vertical and horizontal reset signals RVR and RHR for the field memories 8a and 8b, but also read and write enabling signals REN and WEN and read and write reset signals RR and WR for the line memory 9 in response to the horizontal and vertical synchronizing pulses (H and V pulses) from the output synchronizing signal generator 114a, and then, outputs the signals RVR and RHR through the contact (a) of the switch SW32 to the field memories 8a and 8b, and outputs the signals REN, WEN, RR and WR to the scanning line interpolation circuit 123.

Figure 11:
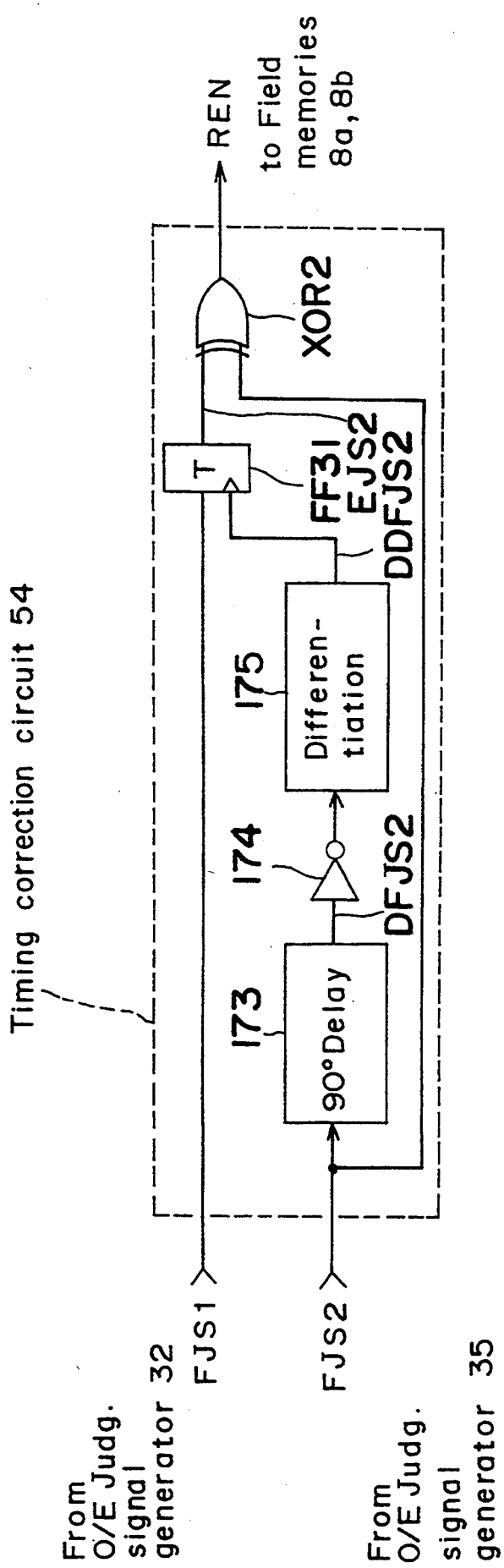
FIG. 11 is a schematic block diagram of a timing correction circuit 54 shown in FIG. 10.

FIG. 11 shows the timing correction circuit 54 shown in FIG. 10.

Referring to FIG. 11, the timing correction circuit 54 comprises a 90 degrees delay circuit 173 for delaying a phase of an inputted signal by 90 degrees, an invertor 174, a differentiation circuit 175, a delay type flip flop FF31 and an exclusive OR gate XOR2. The O/E judgment signal FJS1 from the O/E judgment signal generator 32 is inputted through the flip flop FF31 to the first input terminal of the exclusive OR gate XOR2. On the other hand, the O/E judgment signal FJS2 from the O/E judgment signal generator 35 is inputted the second input terminal of the exclusive OR gate XOR2, and is inputted through the 90 degrees delay circuit 173, the inverter 174 and the differentiation circuit 174 to the clock input terminal of the flip flop FF31. The write enabling signal from the timing correction circuit 54 from the output terminal of the exclusive OR gate XOR2 is inputted to the field memory 8b, and also is inputted through the invertor 125 to the field memory 8a. In FIG. 11, DFJS2 denotes an output of the 90 degrees delay circuit 173, DDFJS2 denotes an output of the differentiation circuit 174, and EJS2 denotes an output of the flip flop FF31.

An operation of the luminance signal converter 111aa of the second preferred embodiment will be described below with reference to FIGS. 10, 11 and 15.

For example, luminance signals of an odd field and even field from the A/D converter 110a are respectively written in the field memories 8a and 8b, alternately by one field, using the write enabling signal WEN or the O/E judgment signal FJS1 from the O/E judgment signal generator 32. On the other hand, the luminance signals of the odd field and the even field are respectively read out from the field memories 8a and 8b, alternately by one field, using the read enabling signal REN from the timing correction circuit 54.

As shown in FIG. 10, there are generated the O/E judgment signal FJS1 of the input side used when writing the luminance signal in the field memories 8a and 8b, and the O/E judgment signal FJS2 of the output side used when reading the luminance signal from the field memories 8a and 8b. Thereafter, as shown in FIG. 11, the signal FJS2 is delayed by 90 degrees by the delay circuit 173, and then, the delayed signal DFJS2 is inputted through the invertor 174 to the differentiation circuit 175. The differentiation circuit 175 generates a differentiation signal DDFJS2, and then, outputs the clock input terminal of the flip flop FF31. Then, the signal FJS1 is latched in response to the differentiation signal DDFJS2 at a timing of a leading edge thereof so as to generate the field replace signal EJS2 for representing whether or not the video signal of the even field is replaced with that of the odd field. In this case, when the field replace signal EJS2 has the high level, the O/E judgment signal FJS2 of the output side is outputted through the exclusive OR gate XOR2 as the read enabling signal REN as it is. On the other hand, when the field replace signal EJS2 has the low level, the O/E judgment signal FJS2 of the output side is inverted by the exclusive OR gate XOR2 and is outputted as the read enabling signal REN.

Figure 15:
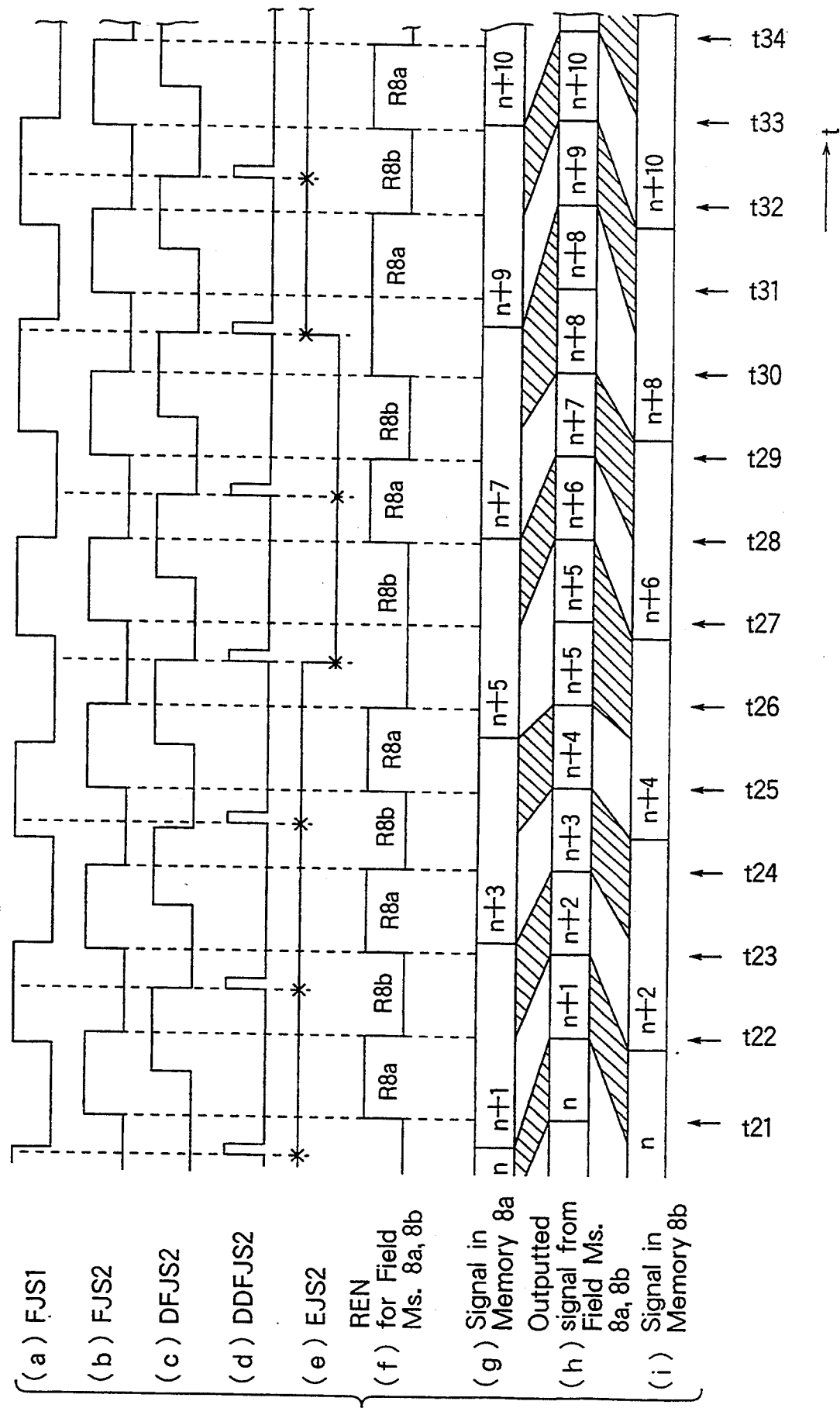
FIG. 15 is a timing chart of respective signals showing respective operations of a luminance signal converter 111aa shown in FIG. 10 and a timing correction circuit 54 of the second preferred embodiment according to the present invention.

FIG. 15 is a timing chart of respective signals showing respective operations of the luminance signal converter 111aa shown in FIG. 10 and the timing correction circuit 54 of the second preferred embodiment. In FIG. 15, n is a natural number.

(f) of FIG. 15 shows the read enabling signal REN outputted from the timing correction circuit 54, wherein R8a denotes a time interval for reading the luminance signal from the field memory 8a, and R8b denotes another time interval for reading out the luminance signal from the field memory 8b.

In case of the field replace signal EJS2 having the high level, when the read enabling signal REN has the high level, the luminance signal of the even field is read out from the field memory 8a. On the other hand, when the read enabling signal REN has the low level, the luminance signal of the odd field is read out from the field memory 8b.

Further, in case of the field replace signal EJS2 having the low level, the scanning lines of the odd field are replaced with the scanning lines of the even field as shown in FIG. 12a. Then, the read enabling signal REN is delayed by one scanning line, and the luminance signal is read out from the field memory 8a or 8b. For example, at a timing t27 shown in FIG. 15, the same luminance signal as that of the previous field (n+5) is read out from the field memory 8b. Further, at a timing t31 shown in FIG. 15, the same luminance signal as that of the previous field (n+8) is read out from the field memory 8a.

As described above, the luminance signal is read out from the field memories 8a and 8b, alternately by one field, and when the scanning lines of the odd field are replaced with those of the even field, the same luminance signal as that of the previous field is read out from the field memory 8a or 8b in order that the read vertical reset signal RVR is pseudosynchronous with the write vertical reset signal WVR. As a result, an image displayed on the CRT display unit 106 is prevented from being divided into two portions.

As described above, according to the first and second preferred embodiments, in case of the NTSC signal, the NTSC signal is converted into the video signal having 625 scanning lines and a field frequency of 60 Hz, and then, an image of the NTSC signal can be displayed on the CRT display unit 106 with 625 scanning lines and a field frequency of 60 Hz. Further, in case of the PAL or SECAM signal, the PAL or SECAM signal is converted into the video signal having a field frequency of 60 Hz and 625 scanning lines, and then, an image of the NTSC signal can be displayed on the CRT display unit 106 with 625 scanning lines and a field frequency of 60 Hz. As a result, deterioration of the quality of image to be displayed can be lowered, resulting in a high quality image displayed on the CRT display unit 106.

Further, according to the first preferred embodiment, each of the luminance and color converters 111a and 111b can be constituted using only one field memory 8, and these converters 111a and 111b can be simplified as compared with the prior art circuits 109a and 109b. As a result, there can be provided a multi-system type television set more inexpensive than the conventional multi-system type television set.

In the above-mentioned preferred embodiments, the CRT display unit 106 is used, however, the present invention is not limited to this. There may be used the other kinds of image display unit with a predetermined field frequency and a predetermined number of scanning lines.

In the above-mentioned preferred embodiments, the line memory 9 is used, however, the present invention is not limited to this. A 1 H delay circuit for delaying a video signal by one scanning line may be used.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

TABLE 1

| Time interval | Amplification factor K of Amplifier 43 | Amplification factor 1-K of Amplifier 42 |
| --- | --- | --- |
| C1 | 0 | 1 |
| C2 | $\frac{1}{5}$ | $\frac{4}{5}$ |
| C3 | $\frac{2}{5}$ | $\frac{3}{5}$ |
| C4 | $\frac{3}{5}$ | $\frac{2}{5}$ |
| C5 | $\frac{4}{5}$ | $\frac{1}{5}$ |
| C6 | 1 | 0 |

What is claimed is:

1. An image display apparatus comprising:
a first synchronizing signal generating means for reproducing and generating first vertical and horizontal synchronizing signals in response to an inputted video signal, said inputted video signal of one frame being composed of an odd field and an even field each field including a plurality of scanning lines;
a second synchronizing signal generating means for generating second vertical and horizontal synchronizing signals for deflection of a display in response to said vertical and horizontal synchronizing signals generated by said first synchronizing signal generating means;
a display means for displaying an image of an inputted video signal thereon with a predetermined field frequency and a predetermined number of scanning lines, said display means being controlled by a deflection which is responsive to said second vertical and horizontal synchronizing signals outputted from said second synchronizing signal generating means;
a first converting means for converting an inputted first video signal, having a first field frequency which is lower than said predetermined field frequency and having said predetermined number of scanning lines, into an output second video signal having said predetermined field frequency and said predetermined number of scanning lines, using said first and second vertical and horizontal synchronizing signals generated by said first and second synchronizing signal generating means, and outputting said output second video signal to said display means; and
a second converting means for converting an inputted third video signal, having a first number of scanning lines which is smaller than said predetermined number of scanning lines and having said predetermined field frequency, into an output fourth video signal having said predetermined field frequency and said predetermined number of scanning lines, using said first and second vertical and horizontal synchronizing signals generated by said first and second synchronizing signal generating means, and for outputting said output fourth video signal to said display means.

2. The apparatus as claimed in claim 1,
wherein said first converting means comprises:
a field memory for storing said inputted first video signal of one field;
a first judgment signal generating means for judging whether or not the scanning lines of the odd field have been replaced by the scanning lines of the even field when displaying the image of said inputted first video signal on said display means, and for generating a first judgment signal for representing the judgment result; and
a first control signal generating means for generating a first write control signal for controlling said field memory to write said inputted first video signal therein and a first read control signal for controlling said field memory to read out said first video signal as said output second video signal therefrom in response to said first and second vertical and horizontal synchronizing signals generated by said first and second synchronizing signal generating means, and for outputting the first write and read control signals to said field memory, said first control signal generating means delaying said first read control signal by one scanning line when said first judgment signal represents that the scanning lines of the odd field have been replaced by the scanning lines of the even field.

3. The apparatus as claimed in claim 1,
wherein said second converting means comprises:
a field memory for storing said inputted third video signal of one field;
a delay means for delaying said third video signal outputted from said field memory by one scanning line;
a second control signal generating means for generating a second write control signal for controlling said field memory to write said inputted third video signal therein and a second read control signal for controlling said field memory to read out said third video signal therefrom so as to insert a predetermined video signal of one field having no data into said read-out third video signal for a predetermined time interval in response to said first and second vertical and horizontal synchronizing signals generated by said first and second synchronizing signal generating means, and for outputting the second write and read control signals to said field memory, the frequency of the second read control signal being set to be higher than that of the second write control signal depending on a ratio of the frequency of the read control signal to the frequency of the write control signal;

a first amplifying means for amplifying said third video signal outputted from said field memory with a predetermined first amplification factor;

a second amplifying means for amplifying said third video signal outputted from said delay means; and an adding means for adding said third video signal amplified by said first amplifying means and said third video signal amplified by said second amplifying means so as to interpolate said predetermined video signal of one field having no data into the added video signal, and for outputting the added video signal having the addition result as said output fourth video signal.

4. The apparatus as claimed in claim 1, wherein said first converting means comprises:

a field memory for storing said inputted first video signal of one field;

a first judgment signal generating means for judging whether or not the scanning lines of the odd field have been replaced by the scanning lines of the even field when displaying the image of said first inputted video signal on said display means, and for generating a first judgment signal for representing the judgment result; and a first control signal generating means for generating a first write control signal for controlling said field memory to write said inputted first video signal therein and a first read control signal for controlling said field memory to read out said first video signal as said output second video signal therefrom in response to said first and second vertical and horizontal synchronizing signals generated by said first and second synchronizing signal generating means, and for outputting the first write and read control signals to said field memory, said first control signal generating means delaying said first read control signal by one scanning line when said first judgment signal represents that the scanning lines of the odd field have been replaced by the scanning lines of the even field, and said second converting means comprises:

said field memory;

a delay means for delaying said third video signal outputted from said field memory by one scanning line;

a second control signal generating means for generating a second write control signal for controlling said field memory to write said inputted third video signal therein and a second read control signal for controlling said field memory to read out said video signal therefrom so as to insert a predetermined video signal of one field having no data into said read-out third video signal for a predetermined time interval in response to said first and second vertical and horizontal synchronizing signals generated by said first and second synchronizing signal generating means, and for outputting the second write and read control signals to said field memory, the frequency of the second read control signal being set to be higher than that of the second write control signal depending on a ratio of the frequency of the second read control signal to the frequency of the write control signal;

a first amplifying means for amplifying said third video signal outputted from said field memory with a predetermined first amplification factor;

a second amplifying means for amplifying said third video signal outputted from said delay means; and an adding means for adding said third video signal amplified by said first amplifying means and said third video signal amplified by said second amplifying means so as to interpolate said predetermined video signal of one field having no data into the added video signal, and for outputting the added video signal having the addition result as said output fourth video signal.

5. A television set comprising:

a tuner means for respectively converting broadcast waves modulated according to a plurality of kinds of video signals into said plurality of kinds of video signals;

a switch means for selecting one of said plurality of kinds of video signals and for outputting a selected video signal;

a first synchronizing signal generating means for reproducing and generating first vertical and horizontal synchronizing signals in response to said selected video signal outputted from said switch means, wherein said selected video signal of one frame is composed of an odd field and an even field, each field including a plurality of scanning lines;

a second synchronizing signal generating means for generating second vertical and horizontal synchronizing signals for deflection of a display in response to said vertical and horizontal synchronizing signals generated by said first synchronizing signal generating means;

a display means for displaying an image of said selected video signal thereon with a predetermined field frequency and a predetermined number of scanning lines, said display means being controlled by a deflection which is responsive to said second vertical and horizontal synchronizing signals outputted from said second synchronizing signal generating means;

a first converting means for converting said selected video signal, having a first field frequency which is lower than said predetermined field frequency and having said predetermined number of scanning lines, into an output second video signal having said predetermined field frequency and said predetermined number of scanning lines, using said first and second vertical and horizontal synchronizing signals generated by said first and second synchronizing signal generating means, and for outputting said output second video signal to said display means; and a second converting means for converting another selected video signal, having a first number of scanning lines which is smaller than said predetermined number of scanning lines and having said predetermined field frequency, into an output fourth video signal having said predetermined field frequency and said predetermined number of scanning lines, using said first and second vertical and horizontal synchronizing signal generated by said first and second synchronizing signal generating means, and for outputting said output fourth video signal to said display means;

wherein said switch means enables one of said first and second converting means to operate depending on said selected video signal.

6. A video signal converter apparatus comprising:

a first converting means for converting an inputted first video signal, having a first field frequency which is lower than a predetermined field frequency and having a predetermined number of scanning lines, into an output second video signal having said predetermined field frequency and said predetermined number of scanning lines, using external first and second vertical and horizontal synchronizing signals, and for outputting said output second video signal, said first input video signal of one frame being composed of an odd field and an even field each field including a plurality of scanning lines;

said first converting means comprising:

a field memory for storing said inputted first video signal of one field;

a first judgment signal generating means for judging whether or not the scanning lines of the odd field have been replaced by the scanning lines of the even field when displaying the image of said inputted first video signal on a display means, and for generating a first judgment signal for representing the judgment result; and a first control signal generating means for generating a first write control signal for controlling said field memory to write said inputted first video signal therein and a first read control signal for controlling said field memory to read out said first video signal as said output second video signal therefrom in response to said external first and second vertical and horizontal synchronizing signals, and for outputting the first write and read control signals to said field memory, said first control signal generating means delaying said first read control signal by one scanning line when said first judgment signal represents that the scanning lines of the odd field have been replaced by the scanning lines of the even field.

7. A video signal converter apparatus comprising:

a second converting means for converting an inputted third video signal, having a first number of scanning lines which are smaller than a predetermined number of scanning lines and having a predetermined field frequency, into an output fourth video signal having said predetermined field frequency and said predetermined number of scanning lines, using external first and second vertical and horizontal synchronizing signals, and for outputting said output fourth video signal, said inputted third video signal of one frame being composed of an odd field and an even field each field including a plurality of scanning lines;

said second converting means comprising:

a field memory for storing said inputted third video signal of one field;

a delay means for delaying said third video signal outputted from said field memory by one scanning line;

a second control signal generating means for generating a second write control signal for controlling said field memory to write said inputted third video signal therein and a second read control signal for controlling said field memory to read out said third video signal therefrom so as to insert a predetermined video signal of one field having no data into said read-out third video signal for a predetermined time interval in response to said external first and second vertical and horizontal synchronizing signals, and for outputting the second write and read signals to said field memory, the frequency of the second read control signal being set to be higher than that of the second write control signal depending on a ratio of the frequency of the read control signal to the frequency of the write control signal;

a first amplifying means for amplifying said third video signal outputted from said field memory by a predetermined first amplification factor;

a second amplifying means for amplifying said third video signal outputted from said delay means; and an adding means for adding said third video signal amplified by said first amplifying means and said third video signal amplified by said second amplifying means so as to interpolate said predetermined video signal of one field having no data in to the added video signal, and for outputting the added video signal having the addition result as said output fourth video signal.

* * * * *